(12) United States Patent
Kusko et al.

(10) Patent No.: US 10,001,573 B2
(45) Date of Patent: Jun. 19, 2018

(54) BOREHOLE FLOW MODULATOR AND INVERTED SEISMIC SOURCE GENERATING SYSTEM

(75) Inventors: David John Kusko, Houston, TX (US); Gabor Vecseri, Houston, TX (US); Daniel Maurice Lerner, Missouri City, TX (US)

(73) Assignee: Teledrill, Inc., Katy, TX (US)

( * ) Notice: Subject to any disclaimer, the term of this patent is extended or adjusted under 35 U.S.C. 154(b) by 999 days.

(21) Appl. No.: 13/582,447

(22) PCT Filed: Mar. 2, 2010

(86) PCT No.: PCT/US2010/025895
§ 371 (c)(1),
(2), (4) Date: Sep. 3, 2012

(87) PCT Pub. No.: WO2011/109014
PCT Pub. Date: Sep. 9, 2011

(65) Prior Publication Data
US 2012/0327742 A1 Dec. 27, 2012

(51) Int. Cl.
*G01V 1/137* (2006.01)
*E21B 47/18* (2012.01)
(52) U.S. Cl.
CPC ............ *G01V 1/137* (2013.01); *E21B 47/182* (2013.01)
(58) Field of Classification Search
CPC ............................. G01V 1/137; E21B 47/182
(Continued)

(56) References Cited

U.S. PATENT DOCUMENTS

| 4,108,050 A | * | 8/1978 | Paynter | ................ F16K 31/16 |
| | | | | 251/59 |
| 5,012,453 A | | 4/1991 | Katz | |

(Continued)

FOREIGN PATENT DOCUMENTS

GB          2156405 A  * 10/1985   ............. E21B 47/18

OTHER PUBLICATIONS

Dethloff, M. (Halliburton), and Steen Agerlin Petersen (Norsk Hydro). Seismic-While-Drilling Operation and Applications, SPE 109893, 2007 SPE Annual Technical Conference and Exhibition, Nov. 11-14, 2007, 6 pages, SPE 109893, Society of Petroleum Engineers, Richardson, TX.

(Continued)

*Primary Examiner* — Daniel L Murphy
(74) *Attorney, Agent, or Firm* — ePatentManager.com; Guerry L. Grune

(57) ABSTRACT

The present invention relates to the vertical seismic profiling (VSP) of geological formations in which profiling is used to obtain information for performing precise interpretations of geophysical seismic data and better understanding of geophysical information. The disclosure involves using a sound source for generating primary and secondary seismic pulses within well boreholes. The seismic profiling system obtains information regarding a geological formation traversed by a borehole with controllable downhole seismic pulse generators with drill string tool(s). The tool(s) have contact with and are coupled to the formation. A seismic pulsing device (SPD) is attached to a portion of the drill string and a valve controller is used to control opening and closing the valve causing high amplitude short duration ultra wide band pressure pulses, generating primary seismic waves sent into surrounding geological formations. This generates second- (Continued)

ary seismic waves received that can be detected by geophones or similar devices.

23 Claims, 17 Drawing Sheets

(58) Field of Classification Search
USPC .......................................................... 367/25
See application file for complete search history.

(56) References Cited

U.S. PATENT DOCUMENTS

| | | | | |
|---|---|---|---|---|
| 5,073,877 | A * | 12/1991 | Jeter | ............ E21B 47/18 367/84 |
| 5,901,113 | A | 5/1999 | Masak et al. | |
| 6,094,401 | A | 7/2000 | Masak et al. | |
| 6,237,701 | B1 * | 5/2001 | Kolle | ............ E21B 7/18 175/1 |
| 6,321,836 | B2 * | 11/2001 | Brett | ............ 166/177.2 |
| 6,898,150 | B2 * | 5/2005 | Hahn | ............ E21B 47/18 137/269 |
| 7,139,219 | B2 * | 11/2006 | Kolle | ............ E21B 47/14 137/105 |
| 7,207,396 | B2 | 4/2007 | Hall et al. | |
| 7,231,766 | B2 | 6/2007 | Hall et al. | |
| 7,242,928 | B2 | 7/2007 | Choi | |
| 7,248,177 | B2 | 7/2007 | Hall et al. | |
| 7,464,772 | B2 | 12/2008 | Hall et al. | |
| 7,551,516 | B2 | 7/2009 | Harmon | |
| 2004/0089475 | A1 * | 5/2004 | Kruspe | ............ E21B 33/1243 175/45 |
| 2006/0072374 | A1 * | 4/2006 | Kusko | ............ E21B 47/187 367/83 |
| 2006/0203614 | A1 | 9/2006 | Harmon | |
| 2007/0040140 | A1 | 2/2007 | Hall et al. | |
| 2007/0242565 | A1 | 10/2007 | Hall et al. | |

OTHER PUBLICATIONS

Rector III, J. W., Marion, B.P., Hardage, R. A., The Use of an Active Drill Bit for Inverse VSP Measurements. Exploration Geophysics 1989, 343-346, 20(2), CSIRO Publishing, Australia.

Lou, M., Zhoa, X., Doherty, F., Jackson, J. A New Approach to VSP. E&P Magazine, Nov. 2008, p. 53-54, Houston, TX.

Moldoveanu, N. and Kapoor, J. Patterns of Progress. E&P Magazine, Nov. 2008, p. 57-59, Houston, TX.

Wei, Z. New Vibrator System Holds Promise. E&P Magazine, Nov. 2008, p. 61-62, Houston, TX.

Cambois, G, Two Sensors Are Clearly Better Than One. E&P Magazine, Nov. 2008, p. 65-68, Houston, TX.

* cited by examiner

BOREHOLE FLOW MODULATOR AND INVERTED SEISMIC SOURCE GENERATING SYSTEM

PRIORITY

This application takes priority under 35 U.S.C. 356(c) from pending International Application No. PCT/US2010/025895, filed Mar. 2, 2010, titled: "Borehole Flow Modulator and Inverted Seismic Source Generating System" and the application is hereby incorporated by reference in its entirety.

FIELD OF DISCLOSURE

The present disclosure relates to the inverted vertical seismic profiling (VSP) of geological formations in which the profiling is used to obtain information needed to perform more precise interpretations of geophysical seismic data and to obtain geophysical information by locating a seismic pulse generator in relation to the surface and/or adjacent boreholes. In particular, the present invention relates to using a sound source for generating primary and secondary seismic pulses within well boreholes.

In addition, the present disclosure also relates to the use of providing seismic information while drilling as well as while performing measurement while drilling (MWD) operations. Also, the seismic pulse generator can be used as a point source whereas receivers on the surface and/or in nearby wellbores can be used to determine the exact location of the point source, and thus where the drill bit is located versus where the MWD and other directional sensors have located it within an ellipse of uncertainty. Additionally, it can also be used to determine where the bit is in relation to other wellbores (by using transit times of the first arrivals to nearby wellbore receivers) so as to avoid them and enhance well spacing, thus maximizing production efficiencies and reducing the risk of blowouts that may occur in the event wellbores collide.

BACKGROUND OF DISCLOSURE

Conventional reflection seismology utilizes surface sources and surface receivers to detect reflections from subsurface acoustic impedance contrasts; i.e., subsurface strata. The image and information obtained utilizing conventional reflection seismology is considered relatively poor due to long travel paths between the sources, reflectors, and receivers.

In vertical seismic profiling (VSP), seismic sources are located at the surface, and sensors (geophones) are suspended in the borehole with a wireline. When the seismic sources are initiated, the received data is recorded and processed for several borehole depths. The VSP can have significant technical limitations, for example, each surface seismic source is costly to apply, adds to the acquisition time, and may cause rig inactivity. Another limitation is that the VSP often causes the generation of multiple ghost images due to energy trapped in the surface layer.

Drilling applications where the downhole geophones are added to a measurement while drilling (MWD) tool string, would have to be decoupled from the drill string, or else they would only be capable of recording the arrival of the relatively large first seismic event. Also, downhole geophones are sensitive to tube wave events traveling up and down the borehole. Thus, to date, vertical seismic profiling has not been successful when used in conjunction with MWD applications.

Acoustic pulses could be generated by piezoelectric crystals and other devices lowered into the borehole by a well logging cable. The cable could supply the devices with continuous electrical power and avoid the problem of making multiple trips into and out of the hole. The principal problem with this technique is that the amount of power that could be transmitted through a logging cable would be low, typically about 200 to 300 watts. The pulses generated in this manner would thus be much lower in energy than those generated by explosives. In addition, very long time periods would be required to store enough energy in the downhole tool to discharge into a high-energy pulse. In either case, very long periods of time would be required at each depth in the borehole to transmit sufficient energy by the piezoelectric crystals to produce acceptable signal-to-noise ratios at the detectors on the surface.

Additionally, explosive charges and large vibrator trucks have been employed as commercial seismic sources for many years, but these techniques have several disadvantages, including the unpredictable characteristics of the explosive sources. In recent years, interest has concentrated on the development of controlled, swept frequency seismic sources that can be used downhole with appropriate receivers positioned either in adjacent holes or on the surface. Early downhole sources suggested designs where the source of the vibratory power, be it pneumatic, hydraulic, electrical, or mechanical, was located on the surface and was somehow transmitted to a downhole actuator.

In all of the above noted applications, the seismic source generates a main pulse and several primary waves which provide sinusoidal signals overlapping of the initial pulse generated primary wave. The resonant secondary waves are difficult to distinguish from a clear main pulse and therefore differentiation of the secondary pulses becomes difficult and analysis of the geological data less precise.

RELEVANT ART

U.S. Pat. No. 6,094,401 to Masak, et. al., and assigned to Schlumberger Technology Corp., describes a method for generating a seismic signal in a formation traversed by a borehole having borehole fluid therein to obtain information regarding the formation and utilizing a borehole tool having formation contact for coupling the borehole tool to the formation. A motor with a rotating drive shaft, a rotor coupled to the drive shaft, a stator which is stationary relative to the rotor, with the rotor and stator arranged to provide substantially sinusoidal signals in the borehole fluid as the rotor turns relative to the stator, a microprocessor coupled to the motor for causing the motor to turn the rotor. The method coupling the borehole tool to the formation utilizing the formation contact means; controlling the motor with the microprocessor so as to turn the rotor such that the substantially sinusoidal signals change in frequency in a frequency sweep over a predetermined frequency range; imparting a force against the formation via the contact means to produce a seismic signal and receiving seismic waveform information relating to the seismic signal with at least one geophone located on or near a surface of the formation.

U.S. Pat. No. 5,901,113 to Masak, et. al., and assigned to Schlumberger Technology Corp., describes a vertical seismic profiling system for obtaining information regarding a formation traversed by a borehole having borehole fluid therein having a frequency controllable downhole seismic course incorporating a drill string tool having formation contact means for causing the tool to be coupled to the formation, a motor with a rotating drive shaft, a rotor coupled to the drive shaft, a stator which is stationary relative to the rotor, with the rotor and stator arranged to produce substantially sinusoidal signals in the borehole fluid as the rotor turns relative to the stator, and a microprocessor coupled to the motor. The microprocessor causes the motor to turn the rotor such that the substantially sinusoidal signals change in frequency in a unidirectional frequency sweep over a predetermined frequency range while the tool is coupled to the formation. A plurality of geophone(s) located on a surface of the formation receives and records seismic waveform information relating to the sinusoidal signals produced by the frequency controllable downhole seismic source. There is a reference signal means located at the surface obtain a reference signal related to the sinusoidal signals produced by the frequency controllable downhole seismic source; and signal processing means for receiving and processing said seismic waveform information recorded by the plurality of geophone means and the reference signal obtained by the reference signal means.

U.S. Pat. No. 5,012,453 to Katz, Lewis J., and unassigned, describes a method for compiling an inverse vertical seismic profile by detection of direct waves and secondary reflectances of a seismic signal produced by a seismic source located within a series of geologic strata in a borehole having a first step of placing one or more seismic sensors in contact with the earth and within sensing distance of a downhole seismic source; a second step of making at least one recording of seismic signals generated by the downhole seismic source located at a first depth position and transmitted through the earth to the seismic sensors and recording direct waves and primary and secondary reflectances thereof; a third step of calculating at least one one-sided autocorrelation function having peaks corresponding to the arrival times at the sensor of the direct waves, primary reflectances and secondary reflectances from the recording; a fourth step of repeating the second and third steps for a plurality of depth positions of the downhole seismic source to produce a plurality of autocorrelation functions each corresponding to a different depth position to produce an inverse vertical seismic profile wherein the secondary reflectance peaks correspond to relative positions of interfaces between different geologic layers.

U.S. Pat. No. 4,928,783 to Crook, Troy N., and assigned to Exxon Mobil Upstream Research Co., describes a seismic source for forming acoustic pulses in drilling fluid in a well borehole having a reservoir means for storing a compressed gas having a first pressure; a body member housing the reservoir means and having mud ports; pressurizing means responsive to an increased pressure in the drilling fluid for further compressing the gas in the reservoir means to a second pressure greater than the first pressure; chamber means in the body member for receiving drilling fluid from the well borehole and storing a charge of drilling fluid; a shuttle means for moving in the body member responsive to the compressed gas at the second pressure in the reservoir means to displace the charge of drilling fluid through the mud ports; control means for arming the shuttle means; and a shoulder means for limiting movement of the shuttle means, thereby causing a cavitations zone in the drilling fluid adjacent the mud ports, which zone when collapsed forms a seismic impulse in the drilling fluid.

U.S. Pat. No. 7,467,685 to Shehab, et. al., and assigned to Schlumberger Technology Corp., describes an apparatus for generating a seismic signal in a wellbore having an elongated housing configured to be disposed in the wellbore; a piston slidably disposed in an internal bore in the elongated housing; a strike plate disposed on the elongated housing proximate one end of the internal bore, where the strike plate has a substantially flat surface opposite the side to be hit by the piston such that a majority of fluid waves generated will propagate in a direction parallel with the longitudinal axis of the elongated housing; a deflecting mass having a cone-shaped surface disposed in the elongated housing and configured to deflect the fluid waves by the cone-shaped surface into directions that are substantially perpendicular to the longitudinal axis of the elongated housing; a slotted sleeve disposed around the strike plate to allow for fluid communication between fluids outside the elongated housing and fluids in a region between the strike plate and the deflecting mass inside the elongated housing and an energizing mechanism configured to move the piston to hit the strike plate.

U.S. Pat. No. 5,113,966 to Gregory, et. al., and assigned to US DOE/AT&T, describes a downhole seismic source for operation within a borehole to produce seismic energy waves through surrounding earth strata having an elongated housing adapted for lowering into the borehole by a cable means; a hydraulic oscillator means carried by the housing for producing seismic vibrations in the housing; a hydraulic pressure source carried by the housing for providing a flow of high pressure hydraulic fluid, having a pump means for recycling the hydraulic fluid and for recharging the downhole seismic source and an electric motor for driving the pump means. The hydraulic pressure source further having a low pressure fluid accumulator which receives spent hydraulic fluid from the hydraulic oscillator means and from the clamp valve means and outputs hydraulic fluid to the pump means which outputs a high pressure hydraulic fluid. There is a heat exchanger means for receiving the high pressure fluid from the pump means and for dissipating heat produced by the pump means in the hydraulic fluid, and a high pressure accumulator for receiving the high pressure hydraulic fluid from the heat exchanger means and for providing the high pressure fluid as an output to an electro-hydraulic servo valve means, whereby the downhole seismic source is recharged for future operation; an electro-hydraulic servo valve means operably connected between the hydraulic pressure source and the hydraulic oscillator means for controlling the flow of high pressure hydraulic fluid from the hydraulic pressure source into the hydraulic oscillator means which thus produces the seismic vibrations; and a clamping means carried by the housing for selectively, rigidly clamping the housing to the wall of the borehole and for allowing the seismic vibrations to be transmitted from the housing through the clamping means to the earth strata. The clamping means has a plurality of shoe members radially-spaced from a longitudinal axis of the housing which are selectively engageable with the wall of the borehole, a piston actuator means for each shoe member for moving each respective shoe member into engagement with the wall of the borehole when subject to a fluid pressure, a clamp valve means for selectively connecting a flow of high pressure hydraulic fluid from the hydraulic pressure source to activate the piston actuators, and a spring means for each piston actuator for retracting a respective shoe member from engagement with the wall of the borehole in the absence of a fluid pressure on the piston actuator.

U.S. Pat. No. 7,475,732 to Hosie, et. al., and assigned to Weatherford/Lamb, Inc., describes a method of using a downhole deployment valve (DDV) in a wellbore extending to a first depth by assembling the DDV as part of a tubular string, the DDV having a valve member movable between an open and a closed position; an axial bore there through in communication with an axial bore of the tubular string when the valve member is in the open position, the valve member substantially sealing a first portion of the tubular string bore from a second portion of the tubular string bore when the valve member is in the closed position; and a sensor configured to sense a parameter of the wellbore or a parameter of a formation; running the tubular string into the wellbore; running a drill string through the tubular string bore and the DDV bore. The drill string having a drill bit located at an axial end thereof drilling the wellbore to a second depth using the drill string and the drill bit; sensing the wellbore or formation parameter with the sensor while drilling the wellbore to the second depth and adjusting a trajectory of the drill string while drilling the wellbore to the second depth.

U.S. Pat. No. 6,550,534 to Brett, James Ford, and assigned to Seismic Recovery, LLC., describes a fluid powered downhole vibration tool used in a well bore wherein fluids are pumped and injected from the surface into a formation through the well bore having a downhole fluid powered motor in fluid communication with the fluids pumped from the surface, the motor powered by fluid being unidirectionally injected into the formation through the well bore such that the fluid is not recycled to the surface and means to vibrate the well bore by action of the fluid powered motor.

U.S. Pat. No. 6,321,836 to Brett, James Ford, and assigned to Seismic Recovery, LLC., describes a fluid powered downhole vibration tool used in a well bore having produced fluids under pressure, the tool having a resonant chamber with a through passage located in the well bore in communication with the fluids under pressure, wherein the chamber vibrates as the fluids pass the through passage and means for coupling the resonant chamber to the well bore, causing vibration of the bore as the chamber vibrates.

U.S. Pat. No. 6,247,533 to Brett, James Ford, and assigned to Seismic Recovery, LLC., describes a fluid powered downhole vibration tool used in a well bore having produced fluids under pressure, the tool having a downhole turbine in fluid communication with the fluids under pressure; a fluid powered turbine motor in the well bore in communication with the turbine, wherein the motor generates electricity and means to vibrate the well bore with the electricity produced by the motor.

U.S. Pat. No. 6,059,031 to Brett, James Ford, and assigned to Seismic Recovery, LLC., describes a fluid powered downhole vibration tool used in a well bore having produced fluids under pressure, the tool having a fluid powered motor located in the well bore, the motor in communication with the fluids under pressure and means to vibrate the well bore by action of the fluid powered motor.

U.S. Pat. No. 6,206,108 to MacDonald, et. al., and assigned to Baker Hughes Inc., describes a bottom hole assembly ("BHA") for drilling an oilfield wellbore having (a) a plurality of sensors carried by the BHA, including at least one BHA condition sensor for determining a physical condition of the BHA, at least one position sensor for determining position of BHA, and at least one drilling parameter sensor for determining a selected drilling parameter, each sensor making measurements during the drilling of the wellbore; (b) a plurality of interactive models in the BHA including at least one model each for manipulating downhole data relating to each sensor in the plurality of sensors and (c) a processor carried by the BHA, utilizing the plurality of interactive models for processing downhole the measurements from the plurality of sensors to determine a plurality of parameters of interest with the processor causing a change of at least one drilling parameter in response to the parameters of interest to improve effectiveness of the drilling of the wellbore.

U.S. Pat. No. 6,112,817 to Voll, et. al., and assigned to Baker Hughes Inc., describes a system for producing formation fluid through a production tubing in a wellbore formed in a subsurface formation having (a) at least one fluid flow device disposed in the wellbore, the at least one fluid flow device having a fluid flow line with a tortuous fluid flow path for reducing pressure between an inlet receiving the formation fluid from the subsurface formation and an outlet discharging the received formation fluid into the production tubing; (b) a flow regulation device for controlling discharge of the formation fluid from the fluid flow line into the production tubing and (c) a control unit for controlling the operation of the flow regulation device to control the fluid flow into the production tubing.

U.S. Pat. No. 7,114,560 to Nguyen, et. al., and assigned to Haliburton Energy Svcs, Inc., describes a method of treating a subterranean formation penetrated by a well bore having injected a consolidation fluid thereby effecting a more uniform penetration of the consolidation fluid into the subterranean formation into the subterranean formation while periodically applying a pressure pulse having a given amplitude and frequency to the consolidation fluid.

U.S. Pat. No. 7,207,396 to Hall, et. al., and assigned to IntelliServ, Inc., describes an apparatus for use in assessing down-hole drilling conditions having a drill string; a plurality of sensors distributed along the length of the drill string and capable of sensing localized down-hole conditions while drilling; at least one computing device coupled to at least one sensor of the plurality of sensors capable of analyzing data output by the sensors and representative of the sensed localized conditions; a down-hole network over which the data may be transmitted as packets from the sensors to the computing device and the downhole network has a plurality of nodes which are in communications with each other through a plurality of cables integrated into sections of the drill string and a plurality of transmission elements adapted to transmit the packets across the joints created by the sections.

WIPO Publication No. WO/2007/037721A1 to Segal, et. al., and assigned to Schlumberger Technology Corp., describes hydraulic fracturing and seismic monitoring. A first method is carried out when a pulse amplitude is sufficient for opening a strike-slip fractures around a crack, wherein the crack is detectable with the aid of traditional means for passively recording seismic waves produced by acoustical events related to the opening of strike-slip fractures and by interpreting the position of the thus obtained events in the form of the events adjacent to the crack. A second method is carried out by using a sharp difference of temporal sequences of a pressure pulse generated in the well and micro earthquakes produced around a crack and consists in processing data received from seismic receivers in such a way that a signal similar to the well pressure pulse is separated, in locating the source of the pulse by analyzing the times of the arrival thereof to the receivers and in identifying the pulse source with the area directly adjacent thereto.

OBJECT OF THE DISCLOSURE

To provide large and clearly distinguishable initial and secondary seismic pulses that differentiates the main or primary seismic pulse from any secondary seismic pulse by using a fast acting (within milliseconds) fluid modulator within a drill string. The modulator design provides a clear single initial primary seismic pulse and distinguishable secondary pulse allowing for; simplified geological data interpretation; and well bore location by using receivers at various locations. Secondary seismic pulse generation is also controlled by the fluid modulator to ensure no interference with the primary seismic pulse. As the flow of the borehole fluid passes through the seismic pulse generator such that a seismic signal is generated when one or more valves that generate seismic pulses is initially closed and subsequently opened primary waves and simultaneously secondary waves are created.

SUMMARY OF THE DISCLOSURE

An initial embodiment involves a seismic profiling system that obtains information regarding a geological formation traversed by a borehole with borehole fluid having at least one controllable downhole seismic pulse generator(s) within one of more drill string tool(s). The tool(s) may have contact with and are often coupled to the formation. A seismic pulsing device is attached to a portion of the drill string tool where the pulsing device is a fluid modulator, a valve with an actuator, and a valve controller. When the valve is initially in the open position the flow of the borehole fluid reaches below the bottom of the seismic pulse generator (SPG) in an unrestricted manner. When the valve is closing the borehole fluid is compressed, generating a controllable high amplitude short duration ultrawide band pressure pulse as seismic wave(s) into the borehole and the geological formation. When the valve is opened, the borehole fluid pressure is released generating subsequent seismic waves. There are one or more seismic sensing devices, geophones, or hydrophones located on or near the surface of the formation, within the borehole, nearby boreholes, or on the drill string for receiving seismic waves; a recording device for recording the signals received by the seismic sensing devices; and an analysis system for analyzing the primary and secondary seismic waves and determining the location of the SPG.

In another embodiment the flow modulator is a valve.

In another embodiment the valve actuator is a motor, a solenoid or an activated cam, or pawl.

In another embodiment the valve controller is equipped with essential capabilities so that the valve can be controlled to produce any desired seismic pressure pulse.

In another embodiment the system provides seismic pressure pulses of a desired and specific amplitude, frequency, dwell time, and speed associated with valve operation (opening or closing).

In another embodiment the flow modulator and controller provide for a valve open time which indicates the amount of time the valve remains in the open position and an associated dwell time, rise time, and fall time, such that the optimal amplitude of the seismic pressure pulse is controllable for seismic wave generation.

In another embodiment the flow modulator valve is adjusted to obtain independent control of the waves by controlling pulse generation such that the initial waves are increased in size when the valve is closed rapidly and the subsequent waves are increased in size when the valve is opened rapidly.

In another embodiment a resonance of the seismic pressure pulse is operated in cooperative resonance with a natural resonance of the geological formation such that the resonance of the seismic pressure pulse and the geological formation is synchronized thereby coupling energy from the seismic pressure pulse with the geological formation thereby increasing the amplitude of the seismic pulse and corresponding waves.

In another embodiment a decoupling tool is employed within the drill string to decouple the seismic pulse generator from any other device positioned above or below the seismic pulse generator allowing for more efficient mechanical energy transfer from the fluid or the SPG into the geological formation.

In another embodiment the system utilizes a reference signal for initial identification of the initial and subsequent seismic waves and assists the analysis system to improve overall signal to noise ratios and for controlling the exact timing for providing wave signatures.

In another embodiment the arrival of a first seismic wave and associated waveform is received uphole (as well as in the same or adjacent boreholes) and is compared to subsequent seismic waves and associated waveforms received at a later time such that a sweep of signals over the entire time period of generating the seismic pressure pulses and receiving the seismic waves or associated waveforms at any location allows for analyzing changes or distortions in size and shape of the seismic waves or associated waveforms. This methodology and analysis allows for finding anomalies within the geological formation as the seismic waves or associated waveforms disclose specific signatures initially generated from seismic waves propagated directly from the seismic pulse generator(s).

In another embodiment at least one seismic sensing device is used to sense and record the primary and secondary seismic wave(s), or associated waveform(s) at or near the surface of the borehole for correlation with a reference signal, a multiplicity of repetitive initial and subsequent seismic wave(s), and/or multiple seismic sensing devices at a multiplicity of locations (such as a grid of seismic sensors).

In another embodiment the seismic signal amplitude, frequency, and width are of magnitude sufficient to provide seismic information that is easily detected and analyzed to describe the geological formation such that the signal is greater than the system, natural, and cultural noise. Specifically, one or more controllable downhole seismic pulse generators (SPG) comprises drill string tool(s), such that the tool(s) are coupled to a formation and a seismic pulsing device attached to a portion of a drill string of the drill string tool(s) wherein the pulsing device comprises a fluid modulator with an actuator that drives a valve, and a valve controller to control the valve such that when the valve is initially in the open position, the flow of the borehole fluid passes through the seismic pulse generator generating a seismic signal. When one or more seismic pulse generator valves is closed and opened a primary wave and simultaneously a secondary wave is created.

The primary wave comprises a positive initial pressure pulse and a subsequent negative pressure pulse above the valve and the secondary wave comprises a negative initial pressure pulse with a subsequent positive pressure pulse below the valve. The amplitude of the primary wave and the secondary wave is determined by; the length of time that the valves are opened and closed; the frequency of opening and closing the valves; and the speed at which the valves are opened or closed thereby providing a powerful seismic signal capable of creating a pressure pulse of at least 200 pounds per square inch with at least 1 watt of energy. Creating the significant amplitude of the powerful seismic signals in this manner, is unknown by those skilled in the art.

In another embodiment the valve is closed within 50-150 milliseconds.

In another embodiment the valve is held open for no less than 50 milliseconds and as long as 1 minute.

DETAILED DESCRIPTION OF THE DRAWINGS

Although the term drilling fluid is used throughout the description to describe the function of the invention, the invention is in no way limited to a flow modulator and seismic generator used solely in drilling operations or used in combination with measurement while drilling operations. The term drilling fluid is intended to simplify describing the disclosed invention.

Figure 1:
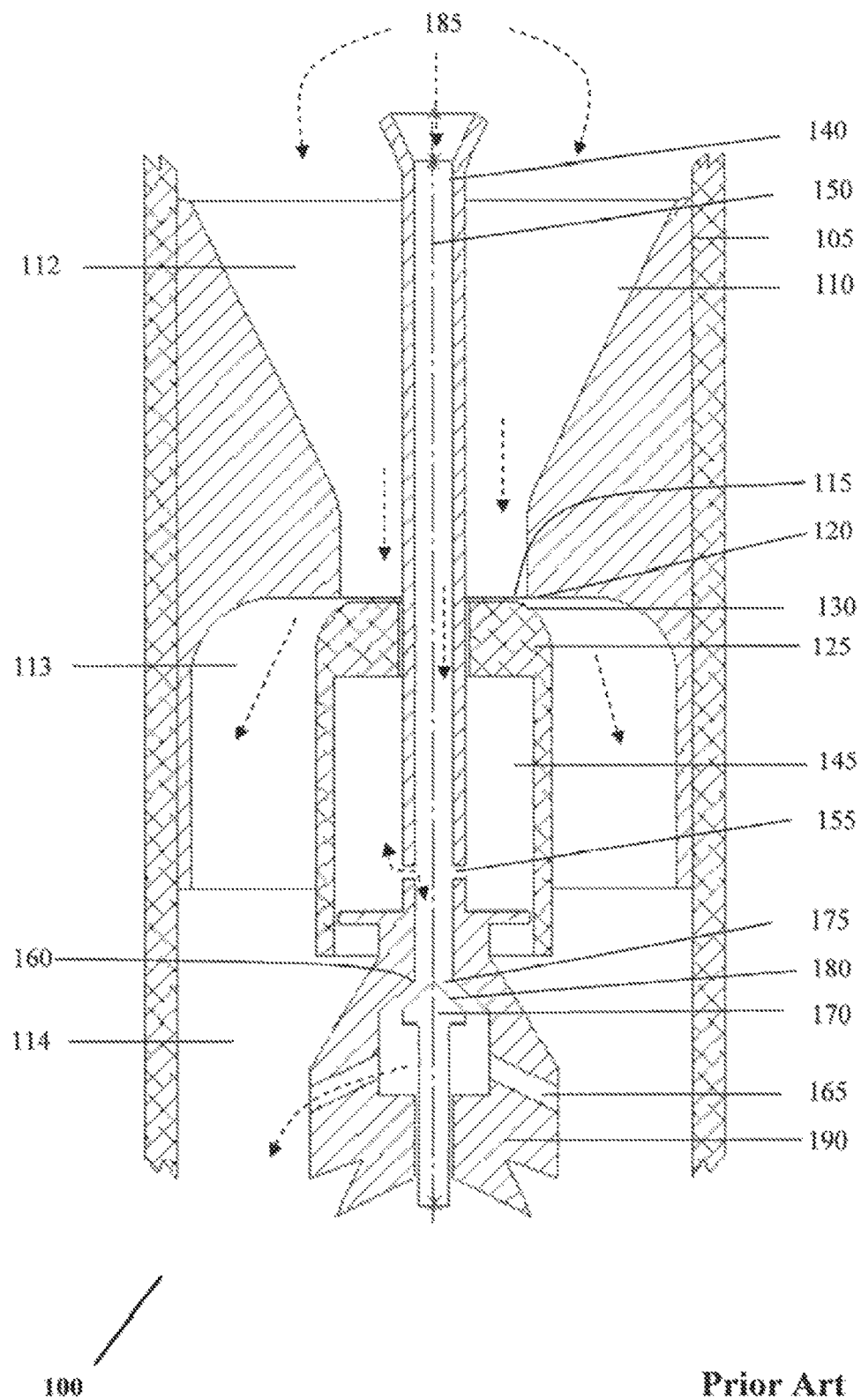
FIG. 1 is a cross section of a flow modulation device using a pulser bell as described in U.S. Pat. No. 7,180,826 (Prior art).

FIG. 1, illustrates a drill collar [105] within a borehole in which a flow modulator [100] resides. Starting at the top of the flow modulator [100] is a flow diverter [110] which forms the basis for an upper flow channel [112]. Features of the flow diverter [110] include a main flow orifice [115], which is a passageway in fluid communication between the upper flow channel [112] and the middle flow channel [113] and a main valve seat [120]. The main valve seat [120] provides an interface area in a main valve [125] closed position (not shown) on which the main valve face [130] contacts, closes, and seals the main flow orifice [115] thereby stopping fluid communication between the upper flow channel [112] and the middle flow channel [113].

The main valve [125] is axially located within the middle flow channel [113] with a pilot flow tube [140] that centrally and axially resides within the main valve [125]. Within the main valve [125] is a main valve pressure chamber [145]. The main valve [125] is linearly moveable along the exterior of the pilot flow tube [140].

The hollow pilot flow tube [140] provides for a pilot flow channel [150] in fluid communication between the main valve pressure port [155], the pilot valve orifice [160] and the pilot flow exit passage [165]. The main valve pressure port [155] is in fluid communication with the pilot flow channel [150] and the main valve pressure chamber [145]. There is at least one main valve pressure port [155] extending from the pilot flow channel [150] to the main valve pressure chamber [145]. The pilot orifice [160] is a fluid passageway that extends past the pilot valve [170] and through the pilot flow exit passage [165].

The pilot flow tube [140] transitions into a pilot valve seat [175], such that the seat provides an interface area in the pilot valve [170] closed position (not shown) on which the pilot valve face [180] contacts, closes, and seals the pilot valve orifice [160]. This stops fluid communication between the pilot flow channel [150] and the pilot flow exit passage [165]. The pilot flow exit passage [165] is in fluid communication with the lower flow channel [114].

Operationally, the flow modulator [100] resides in an annular area of drilling fluid [185] (depicted as flowing from the top to the bottom of FIG. 1). In the main valve [125] open position (shown) the drilling fluid [185] flows into and through the pilot flow channel [150], pilot valve orifice [160] and the pilot flow exit passage [165] and into the lower flow channel [114].

Simultaneously, the drilling fluid [185] flows into the upper flow channel [112], as formed by the flow diverter [110], past the main flow orifice [115] into the middle flow channel [113] and through to the lower flow channel [114]. In the main valve [125] open position, the main valve pressure chamber [145] pressure is lower than the pressure of the drilling fluid [185] allowing the pressure of the drilling fluid [185] moving through the upper flow channel [112] to urge the main valve face [130] away from the main valve seat [120] which allows for maintaining fluid communication between the main flow orifice [115] and the upper flow channel [112] and the middle flow channel [113].

As the main valve [125] is closed, the pilot valve [170] is urged by a controller (not shown) to move upward, restricting the flow of drilling fluid [185] through the pilot valve orifice [160]. The pilot valve face [180] contacts the pilot valve seat [175] closing off the pilot valve orifice [160], stopping the flow of drilling fluid [185] through the pilot valve orifice [160] and into the pilot flow exit passage [165].

Drilling fluid [185] in the pilot flow channel [150] is then diverted into the main valve pressure port(s) [155], filling the main valve pressure chamber [145] creating pressure within the main valve pressure chamber [145] greater than the pressure of the drilling fluid [185] in the upper flow channel [112]. As the pressure of the drilling fluid [185] in the main valve pressure chamber [145] increases, the main valve [125] moves upward within the pilot flow tube [140] toward the main flow orifice [115] and main valve seat [120]. The movement of the main valve [125] causes the volume of the main valve pressure chamber [145] to increase, maintaining a constant pressure under volumetric expansion. When the main valve [125] has moved upward so that the main valve face [130] initiates contact with the main valve seat [120], the main flow orifice [115] is closed. This action stops the drilling fluid [185] flow from the upper flow channel [112] to the middle flow channel [113]. When contact between the main valve face [130] and the main valve seat [120] is made, a primary pressure pulse is created in the drilling fluid [185]. All flow of the drilling fluid [185] is stopped within the flow modulator [100]. The primary pressure pulse of the drilling fluid [185] is transmitted through the drilling fluid [185] uphole, as well as through the drill collar [105] as a primary seismic shock and into the strata of the geological formation(s) (not shown) in the immediate area. The primary pressure pulse and the primary seismic shock are then sensed, recorded and analyzed via seismic sensing and monitoring instrumentation (not shown) to determine the geologic formation, anomalies and changes in the strata. The seismic sensing and monitoring instrumentation may be located in same wellbore drill string (not shown), on the surface or in nearby boreholes. Additionally, the increased pressure within the drill collar [105] straightens the entire drill string and, with the uphole drill string secured, has a tendency to force the downhole drill string into the rockface (not shown) thereby assisting with moving the cutting tool [190] into the rockface.

When the flow of the drilling fluid [185] is completely stopped, there is a region of high pressure maintained in the upper flow channel [112] as drilling fluid [185] continues to be pumped downhole into the restricted flow modulator [100]. Accordingly, there is a negative pressure created downward from the middle flow channel [113] and beyond, due to the residual drilling fluid [185] continuing and exiting into the bottom of the well, resulting in diverting and reversing the flow into the borehole outside the drill collar [105].

Actuation of the main valve [125] from the opened to closed position could be within 5 milliseconds. This is the result of using drilling fluid [185] under pressure within the small available volume of the pilot flow channel [150] which, when stopped by the action of the pilot valve [170] transitioning into a pilot valve seat [175], rapidly fills the relatively small main valve pressure chamber [145] thereby moving the main valve [125] upward. This action results in stopping the flow of drilling fluid [185] through the main flow orifice [115].

From a signal to the controller (not shown), the pilot valve [170] moves away from the pilot valve seat [175], releasing contact between the pilot valve face [180] and pilot valve seat [175] such that the pilot valve orifice [160] reestablishes fluid communication between the pilot flow channel [150] and the pilot flow exit passage [165]. Drilling fluid [185] begins to flow out the pilot flow exit passage [165] and into the lower flow channel [114], releasing pressure of the drilling fluid [185] within the pilot flow channel [150], main valve pressure port(s) [155] and main valve pressure chamber [145]. As the pressure of the drilling fluid [185] decreases in the main valve pressure chamber [145], the main valve [125] moves down the pilot flow tube [140], decreasing the available volume within the main pressure valve chamber [145]. Downward movement of the main valve [125] releases contact between the main valve face [130] and the main valve seat [120] opening the main flow orifice [115] to allow fluid communications between the upper flow channel [112] and middle flow channel [113].

Opening the main valve orifice [115] allows the flow of drilling fluid [185] to pass through the flow modulator [100], reversing the negative pressure built up in the middle flow channel [113] and below. The restoration of nominal pressures in the drilling fluid [185] creates a secondary pressure pulse(s) and secondary seismic shock(s). The secondary pressure pulse of the drilling fluid [185] is transmitted through the drilling fluid [185] uphole as well as through the drill collar [105] as a secondary seismic shock and subsequently into the strata of the geological formation(s) in the immediate area. The secondary pressure pulse and the corresponding secondary seismic shock are then sensed, recorded and analyzed via seismic sensing and monitoring instrumentation.

The flow modulator [100] may be used in a drill string to create primary pressure pulse(s) and primary seismic shock(s) and secondary pressure pulse(s) and secondary seismic shock(s) during measurement while drilling (MWD) or just during drilling without the MWD or while there is no drilling being performed.

Figure 2:
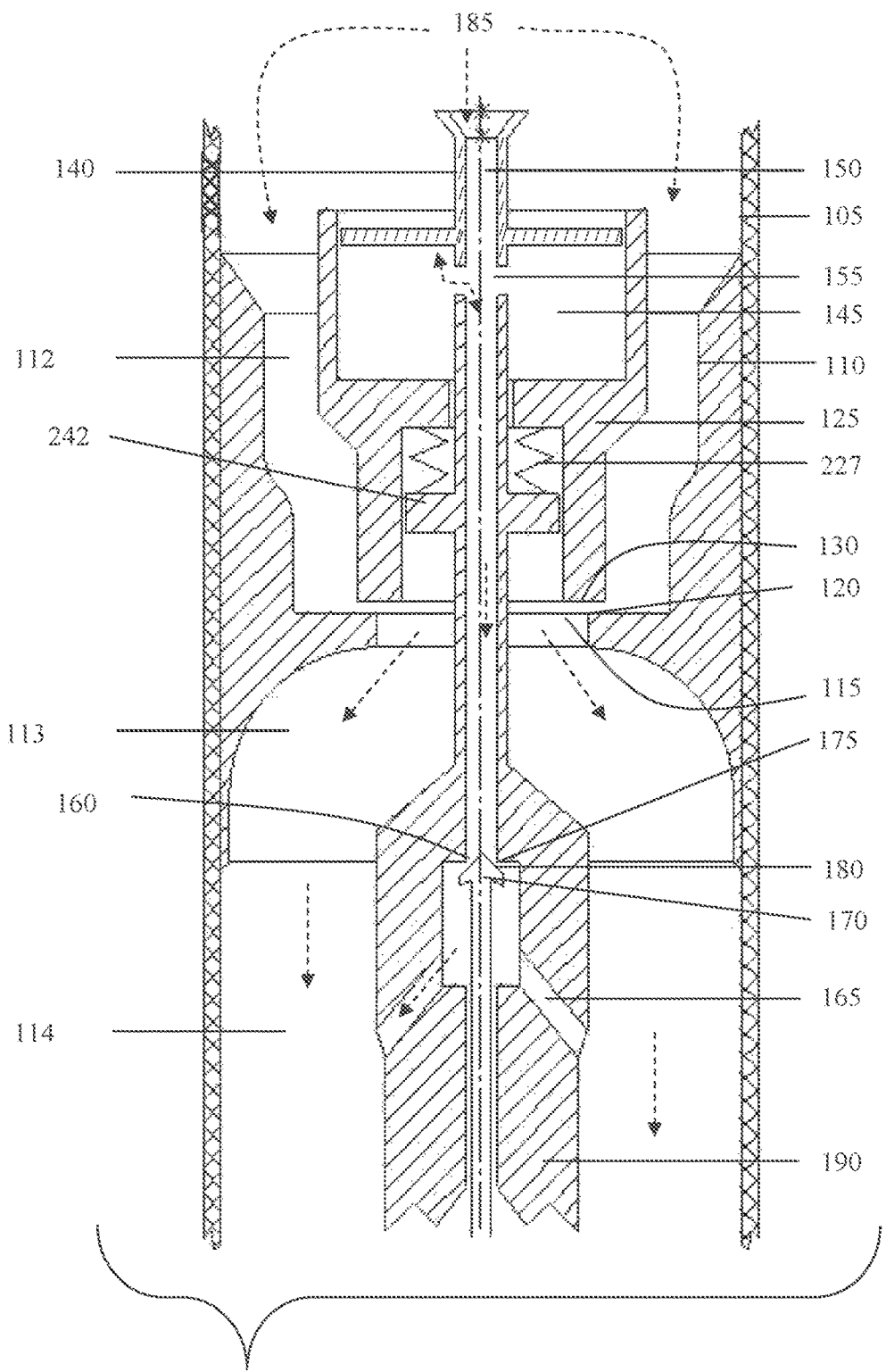
FIG. 2 is a flow modulation device that operates inversely within a drill string from the prior art.

FIG. 2, illustrates that the drill collar [105] within a borehole includes a flow modulator [100]. Starting at the top of the flow modulator [100] is a flow diverter [110] which is the basis for the upper flow channel [112]. Features of the flow diverter [110] include a main flow orifice [115], which is a passageway in fluid communication between the upper flow channel [112] and the middle flow channel [113] and a main valve seat [120]. The main valve seat [120] provides an interface area associated with the main valve [125] closed position (not shown) such that the main valve face [130] contacts, closes and seals the main flow orifice [115] stopping fluid communication between the upper flow channel [112] and the middle flow channel [113].

The main valve [225] is axially located within the middle flow channel [113] with a pilot flow tube [140] centrally and axially located within the main valve [125]. Within the main valve [125] is a main valve pressure chamber [145]. The main valve [125] is linearly moveable along the exterior of the pilot flow tube [140]. Concentrically located within the main valve [125] is a main valve return spring [227] which resides between a pilot tube land [242] and the base of the main valve [125].

The pilot flow tube [140] is hollow providing a pilot flow channel [150] in fluid communication between the main valve pressure port [155], the pilot valve orifice [160] and the pilot flow exit passage [165]. The main valve pressure port [155] is in fluid communication between the pilot flow channel [150] and the main valve pressure chamber [145]. There is at least one main valve pressure port [155] extending from the pilot flow channel [150] to the main valve pressure chamber [145]. The pilot valve orifice [160] is a fluid passageway extending past the pilot valve [170] and through the pilot flow exit passage [165].

The pilot flow tube [140] transitions into a pilot valve seat [175] which provides an interfacial area of the pilot valve [170] in the closed position (not shown) on which the pilot valve face [180] contacts, closes, and seals the pilot valve orifice [160] stopping fluid communication between the pilot flow channel [150] and the pilot flow exit passage [165]. The pilot flow exit passage [165] is in fluid communication with the lower flow channel [114].

Operationally, the flow modulator [100] resides in an annular area of drilling fluid [185] (depicted as flowing from the top to the bottom of FIG. 2). In the main valve [125] open position (shown) the drilling fluid [185] flows into and through the pilot flow channel [150], pilot valve orifice [160] and the pilot flow exit passage [165] and into the lower flow channel [114]. The main valve [125] is held in the open position by the force of the main valve return spring [227].

Simultaneously, the drilling fluid [185] flows into the upper flow channel [112], formed by the flow diverter [110], past the main flow orifice [115] into the middle flow channel [113] and continues into the lower flow channel [114] and then to the bottom of the wellbore.

In the main valve [125] open position, the main valve pressure chamber [145] pressure is lower than the pressure of the drilling fluid [185] and the main valve return spring [227] maintains the main flow orifice [115] with fluid communication between the upper flow channel [112] and the middle flow channel [113].

When closing the main valve [125], the pilot valve [170] is urged by a controller (not shown) to move upward, restricting the flow of drilling fluid [185] through the pilot valve orifice [160]. The pilot valve face [180] contacts the pilot valve seat [175] closing off the pilot valve orifice [160], stopping the flow of drilling fluid [185] through the pilot valve orifice [160] and into the pilot flow exit passage [165]. Drilling fluid [185] in the pilot flow channel [150] is then diverted into the main valve pressure port(s) [155], filling the main valve pressure chamber [145] creating pressure within the main valve pressure chamber [145] greater than the pressure of the drilling fluid [185] in the upper flow channel [112] and the main valve return spring [227]. As the pressure of the drilling fluid [185] in the main valve pressure chamber [145] increases, the main valve [125] moves down the pilot flow tube [140] toward the main flow orifice [115] and main valve seat [120]. The movement of the main valve [125] causes the volume of the main valve pressure chamber [145] to increase, which allows for maintenance of a constant pressure under volumetric expansion. When the main valve [125] has moved downward such that the main valve face [130] initiates contact with the main valve seat [120], the main flow orifice [115] is closed, stopping drilling fluid [185] flow from the upper flow channel [112] to the middle flow channel [113]. When contact between the main valve face [130] and the main valve seat [120] is made, a primary pressure pulse is created in the drilling fluid [185]. All flow of the drilling fluid [185] is stopped within the flow modulator [100]. The primary pressure pulse of the drilling fluid [185] is transmitted through the drilling fluid [185] uphole, as well as through the drill collar [105] as a primary seismic shock that subsequently extends into the strata of the geological formation(s) (not shown) in the immediate area. The primary pressure pulse and the primary seismic shock are then sensed, recorded and analyzed via seismic sensing and monitoring instrumentation (not shown) to determine the geologic formation, anomalies and changes in the strata. The seismic sensing and monitoring instrumentation may be located in the same wellbore drill string (not shown), on the surface or in nearby boreholes. Additionally, the increased pressure within the drill collar [105] straightens the entire drill string and, with the uphole drill string secured, forces the downhole drill string into the rockface (not shown) thereby assisting with moving the cutting tool [190] into the rockface.

When all the flow of the drilling fluid [185] is stopped there is a region of high pressure maintained in the upper flow channel [112] as drilling fluid [185] continues to be pumped downhole into the restricted flow modulator [100]. Accordingly, there is a negative pressure created below the middle flow channel [113] and beyond due to the residual drilling fluid [185] continuing and exiting into the bottom of the well resulting in diverting and reversing the flow into the borehole outside the drill collar [105].

Actuation of the main valve [125] from the opened to closed position can occur within 5 milliseconds. This is accomplished by using drilling fluid [185] under pressure within the available small volume of the pilot flow channel [150] which when stopped by the action of the pilot valve [170] rapidly fills the relatively small main valve pressure chamber [145] thereby moving the main valve [125] downward, resulting in stopping the flow of drilling fluid [185] through the main flow orifice [115].

When a signal is sent to the controller (not shown), the pilot valve [170] moves away from the pilot valve seat [175], causing release of the contact between the pilot valve face [180] and pilot valve seat [175] such that the pilot valve orifice [160] reestablishes fluid communication between the pilot flow channel [150] and the pilot flow exit passage [165]. Drilling fluid [185] begins to flow out of the pilot flow exit passage [165] and into the lower flow channel [114], releasing pressure of the drilling fluid [185] within the pilot flow channel [150], main valve pressure port(s) [155] and main valve pressure chamber [145]. As the pressure of the drilling fluid [185] decreases in the main valve pressure chamber [145], the main valve [125] moves up the pilot flow tube [140], decreasing the available volume within the main pressure valve chamber [245]. Upward movement of the main valve [125] releases contact between the main valve face [130] and the main valve seat [120] opening the main flow orifice [115] to allow fluid communications between the upper flow channel [112] and middle flow channel [113].

Opening the main flow orifice [115] allows the flow of drilling fluid [185] to pass through the flow modulator [100], reversing the negative pressure build up within the middle flow channel [113] and below. The restoration of nominal pressures in the drilling fluid [185] creates a secondary pressure pulse(s) and secondary seismic shock(s). The secondary pressure pulse of the drilling fluid [185] is transmitted through the drilling fluid [185] uphole as well as through the drill collar [105] as a secondary seismic shock and subsequently the shock reaches the strata of the geological formation(s) in the immediate area. The secondary pressure pulse and the secondary seismic shock are then sensed, recorded and analyzed via seismic sensing and monitoring instrumentation.

The flow modulator [100] may be used in a drill string to create primary pressure pulse(s) and primary seismic shock(s) and secondary pressure pulse(s) and secondary seismic shock(s) during measurement while drilling (MWD) or just during drilling without the MWD or while there is no drilling being performed.

Figure 3:
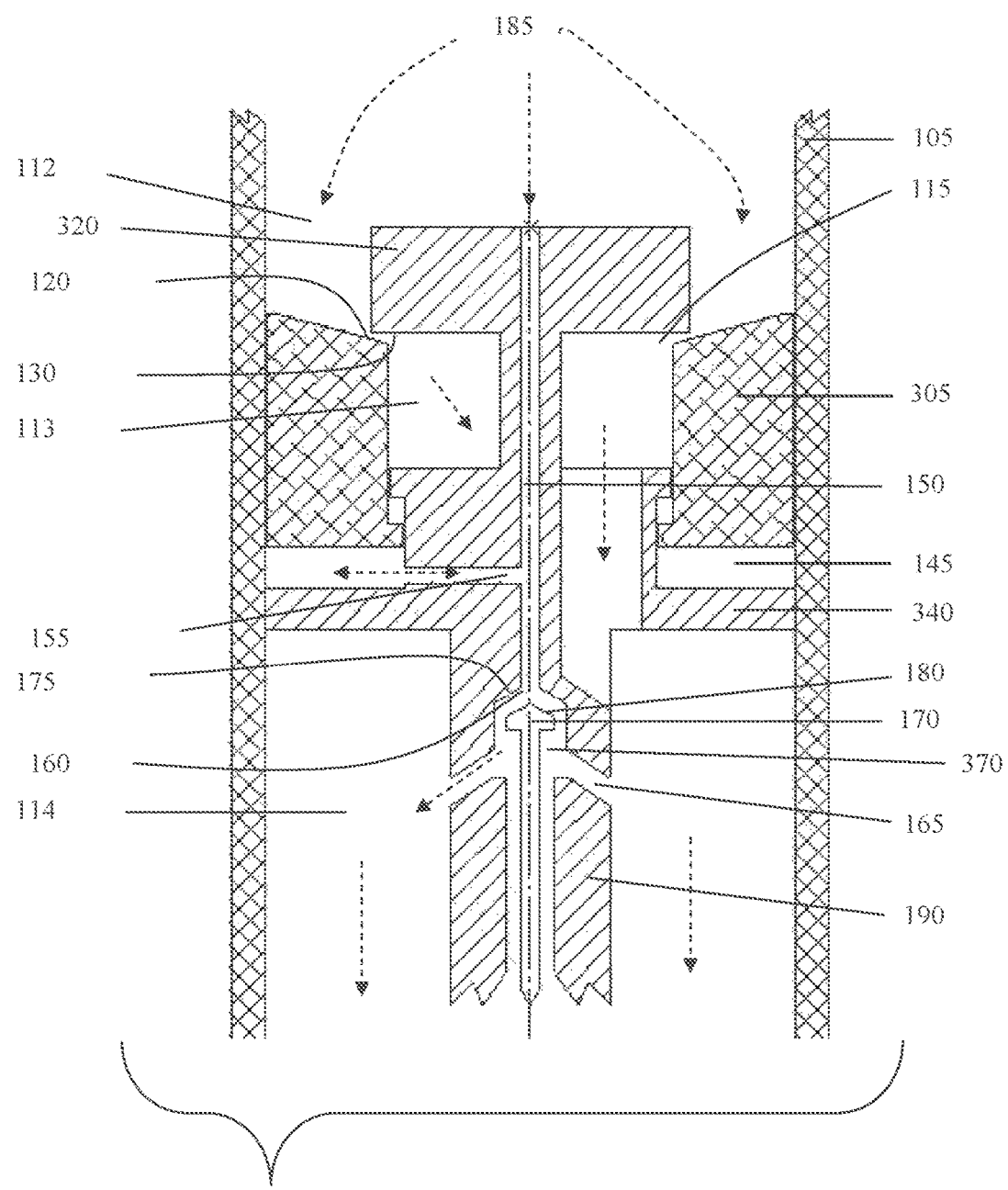
FIG. 3 is a flow modulation device where the central main valve is held stationary and the valve orifice in the form of a ring moves axially within a drill string.

FIG. 3 illustrates a drill collar [105] within a borehole with a flow modulator [100]. Starting from the top of the flow modulator [100] there exists a laterally positioned main ring valve [305], which is axially moveable within the drill collar [105]. The top portion of the main ring valve [305] has a main valve seat [120] providing an opening for the main flow orifice [115] and providing for fluid communication between the upper flow channel [112] and the middle flow channel [113]. The main valve seat [120] provides an interfacial area of the main valve body [320] in the closed position (not shown) for allowing contact with the main valve face [130]. The main valve face [130] closes and seals the main flow orifice [115] stopping fluid communication between the upper flow channel [112] and the middle flow channel [113].

Centrally and axially located within the main ring valve [305] is the main valve body [320] with a main valve body face [322]. The middle flow channel [113] is formed by the space between the main valve body [320] and the main ring valve [305]. The middle flow channel [113] is in fluid communication with the lower flow channel [114] below the main valve face [130]. The main valve body [320] is secured within the drill collar [105]. Centrally located with respect to the main valve body [320] is the pilot flow channel [150] which is in fluid communication with the upper flow channel [112] and the lower flow channel [114], but isolated from the middle flow channel [113]. A main valve pressure port [155] provides a fluid channel to the main valve pressure chamber [145] which is formed on an upper boundary by the main ring valve [305] and the main valve body land [340]. The main valve body [320] also contains features that provide a pilot valve seat [175] at the lower end of the pilot flow channel [150], a pilot valve orifice [160] within the pilot valve seat [175] and pilot flow exit passage(s) [165]. A pilot valve [170] with a pilot face [365] that is directed toward the pilot valve seat [175] resides within a pilot valve chamber [370]. The pilot valve seat [175] provides an interfacial area such that in the closed position (not shown), the pilot valve face [180] contacts, closes and seals the pilot valve orifice [160] stopping fluid communication between the pilot flow channel [150] and the pilot flow exit passage(s) [165]. The pilot flow exit passage(s) [165] are in fluid communication with the lower flow channel [114].

Operationally, the flow modulator [100] resides in an annular area of drilling fluid [185] (depicted as flowing from top to bottom of FIG. 3). When the main valve body [320] is in the open position (shown) the drilling fluid [185] flows into the pilot flow channel [150], through the pilot valve orifice [160] and through the pilot flow exit passage(s) [165]. The pilot valve [170] is moved upward by a controller (not shown) causing the pilot valve face [180] to come in contact with the pilot valve seat [175] such that the pilot valve orifice [160] is closed, shutting off the flow of drilling fluid [185] into the pilot valve chamber [370]. Drilling fluid [185] in the pilot flow channel [150] is then diverted into the main valve pressure port(s) [155], filling the main valve pressure chamber [145] creating pressure within the main valve pressure chamber [145] greater than the pressure of the drilling fluid [185] in the upper flow channel [112]. The main ring valve [305] is moved upward to establish contact between the main valve body face [322] and the main valve seat [120] closing the main flow orifice [115] and stopping the flow of drilling fluid [185].

When contact between the main valve body face [322] and the main valve seat [120] is made, a primary pressure pulse is created in the drilling fluid [185]. All flow of the drilling fluid [185] is stopped within the flow modulator [100]. The primary pressure pulse in the drilling fluid [185] is transmitted through the drilling fluid [185] uphole, as well as through the drill collar [105] as a primary seismic shock and into the strata of the geological formation(s) (not shown) in the immediate area. The primary pressure pulse and the primary seismic shock are then sensed, recorded and analyzed via seismic sensing and monitoring instrumentation (not shown) to determine the geologic formation, anomalies, and changes in the strata. The seismic sensing and monitoring instrumentation may be located in the same wellbore drill string (not shown), on the surface or in nearby boreholes. Additionally, the increased pressure within the drill collar [105] straightens the entire drill string and, with the uphole drill string secured, forces the downhole drill string into the rockface (not shown) thereby assisting with moving the cutting tool [190] into the rockface.

With all the flow of the drilling fluid [185] stopped there is a region of high pressure maintained in the upper flow channel [112] as drilling fluid [185] that continues to be pumped downhole into the restricted flow modulator [100]. Accordingly, there is a negative pressure created below the middle flow channel [113] and beyond due to the residual drilling fluid [185] continuing and eventually exiting into the bottom of the well, eventually diverting and reversing the flow into the borehole outside the drill collar [105].

Actuation of the main valve body [320] from the opened to closed position may occur within 5 milliseconds. This is the result of using drilling fluid [185] under pressure within the available small volume of the pilot flow channel [150] which when stopped by the action of the pilot valve [170] rapidly fills the relatively small main valve pressure chamber [145], thereby moving the main ring valve [305] upward and stopping the flow of drilling fluid [185] through the main flow orifice [115].

When a signal is sent to the controller (not shown), the pilot valve [170] moves away from the pilot valve seat [175], releasing contact between the pilot valve face [180] and pilot valve seat [175] such that the pilot valve orifice [160] reestablishes fluid communication between the pilot flow channel [150] and the pilot flow exit passage [165]. Drilling fluid [185] begins to flow out the pilot flow exit passage [165] and into the lower flow channel [114], releasing pressure of the drilling fluid [185] within the pilot flow channel [150], main valve pressure port(s) [155] and main valve pressure chamber [145]. As the pressure of the drilling fluid [185] decreases in the main valve pressure chamber [145], the main ring valve [305] moves down the drill collar [105]. Downward movement of the main ring valve [305] releases contact between the main valve body face [322] and the main valve seat [120] opening the main flow orifice [115] to allow fluid communications between the upper flow channel [112] and middle flow channel [113].

Opening the main valve orifice [115] allows the flow of drilling fluid [185] to pass through the flow modulator [100], thus reversing the negative pressure build up within the middle flow channel [113] and below. The restoration of nominal pressures in the drilling fluid [185] creates a secondary pressure pulse(s) and secondary seismic shock(s). The secondary pressure pulse of the drilling fluid [185] is transmitted through the drilling fluid [185] uphole as well as through the drill collar [105] as a secondary seismic shock and into the strata of the geological formation(s) in the immediate area. The secondary pressure pulse and the secondary seismic shock are then sensed, recorded, and analyzed via seismic sensing and monitoring instrumentation.

The flow modulator [100] may be used in a drill string to create primary pressure pulse(s) and primary seismic shock(s) and secondary pressure pulse(s) and secondary seismic shock(s) during measurement while drilling (MWD) or just during drilling without the MWD or while there is no drilling being performed.

Figure 4:
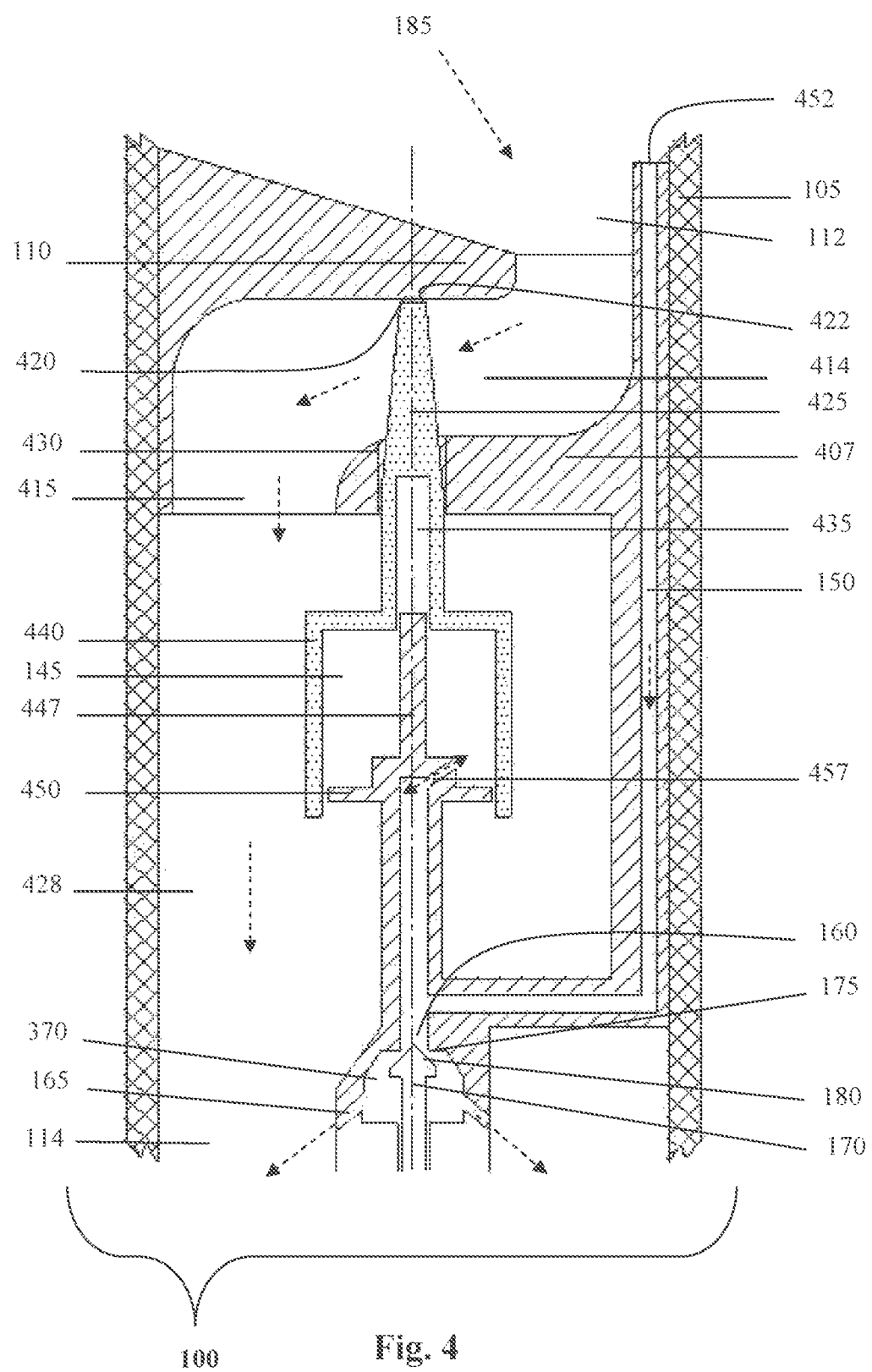
FIG. 4 is a flow modulation device employing a gate operating across a flow channel to regulate the flow of fluid within the flow channel.

FIG. 4 illustrates that within a borehole is a drill collar [105] in which a flow modulator [100] resides. From the top of the flow modulator [100] is a gate web [407] that forms a flow diverter [110], which protrudes into the upper flow channel [112] urging drilling fluid [185] through the main flow inlet [413] toward the main flow channel [414]. The upper flow channel [112], main flow inlet [413], main flow channel [414] and main flow outlet [415] are within the structure of the gate web [407] and are in fluid communication. The flow diverter [110] has a gate seat [420] axially located within the drill collar [105] providing a contact area for the gate face [422].

The gate face [422] provides interfacial area for a moveable gate valve [425] when in the closed position (shown). The gate valve [425] contacts, closes and seals the main flow channel [414] stopping fluid communication between the upper flow channel [112] and the annular area channel [428]. The gate valve [425] is held in an axial position by a web locator [430] within the gate web [407]. The web locator [430] positions the gate valve [425] in an axial position relative to the drill collar [105]. Features of the gate valve [425] include the guide bore [435], the valve actuator [440] and the main valve pressure chamber [145]. The guide bore [435] provides a locating channel for the valve actuator guide [447] so that when the gate valve [425] moves the movement is linear along the valve actuator guide [447] axial centerline. The valve actuator [440] provides an outer wall and the pressure chamber land [450] the base for the main valve pressure chamber [145].

A pilot flow inlet [452] is located across the upper flow channel [112] from the flow diverter [110] and is in fluid communication with the pilot flow channel [150]. The pilot flow channel [150] continues in fluid communication through the gate web [407] extending from a junction upwards through the valve pressure port [457] and downwards forming the pilot valve seat [175] which is an interface for the pilot valve face [180] in the closed position (not shown). The fluid continues through the pilot valve orifice [160], a fluid communication channel, and pilot valve chamber [370] which is housing for the pilot valve [170], through the pilot flow exit passage(s) [165] and into and through the lower flow channel [114].

Within the pilot valve chamber [370] are the pilot valve [170] and the pilot valve face [180]. The pilot valve [170] is linearly and axially moveable and is constrained in its upward movement by the pilot valve face [180] and pilot valve seat [175].

Operationally, the flow modulator [100] resides in an annular area of drilling fluid [185] (depicted as flowing from top to bottom of FIG. 4). In the pilot valve [170] open position (shown) the drilling fluid [185] flows into and through the pilot flow inlet [452], pilot flow channel [150], pilot valve orifice [160], pilot valve chamber [370] the pilot flow exit passage [165] and into the lower flow channel [114], also allowing fluid from the main valve pressure chamber [145] to exit through the valve pressure port [457] and through the pilot valve chamber [370], the pilot flow exit passage [165] to the lower flow channel [114]. The main valve pressure chamber [145] is at minimum volume capacity formed within the valve actuator [440] and the pressure chamber land [450].

Simultaneously, the drilling fluid [185] flows into the upper flow channel [112], as formed by the flow diverter [110], past the main flow inlet [413] into the main flow channel [414], main flow outlet [415], annular area channel [428] and through to the lower flow channel [114]. The gate valve [425] is in a lowered position with the gate face [422] nearly flush to the upper surface of the web locator [430] allowing for an unobstructed main flow channel [414]. In the lowered or opened position (not shown) of the gate valve [425], a majority of the valve actuator guide [447] is within the guide bore [435]. The flow of the drilling fluid [185] through the main flow channel [414] and the main flow outlet [415] into the annular area channel [428] is directed such that it causes the valve actuator [440] to retract downward.

Closing the pilot valve [170] occurs by urging a controller (not shown) to move upward, restricting the flow of drilling fluid [185] through the pilot valve orifice [160]. The pilot valve face [180] contacts the pilot valve seat [175] closing off the pilot valve orifice [160], stopping the flow of drilling fluid [185] through the pilot valve orifice [160] and into the pilot flow exit passage [165]. Drilling fluid [185] in the pilot flow channel [150] is diverted into the valve pressure port(s) [457], fills the main valve pressure chamber [145] creating pressure within the main valve pressure chamber [145] that is the same as the pressure of the drilling fluid [185] above the upper flow channel [112]. As the volume and pressure of the drilling fluid [185] in the valve pressure chamber [445] increases and reaches the level of the pressure of the fluid above the upper flow channel [112] which is greater than the pressure of the fluid in the main flow inlet [413], the valve actuator [440] with the gate valve [425] moves linearly up the valve actuator guide [447] urging the gate valve [425] upward through the web locator [430]. Movement of the gate valve [425] stops when the gate face [422] makes contact with the gate seat [420] blocking off the flow of drilling fluid [185] through the main flow channel [414]. Closing of the valve occurs because the pressure of the drilling fluid [185] in the main valve pressure chamber [145] is acting on a larger area than the drilling fluid [185] in the main flow channel [414], thus providing a larger force for closing.

When contact between the gate face [422] and the gate seat [420] is established, a primary pressure pulse is created in the drilling fluid [185]. Flow of the drilling fluid [185] is stopped within the flow modulator [100]. The positive primary pressure pulse of the drilling fluid [185] upstream from the valve is transmitted through the drilling fluid [185] uphole, as well as through the drill collar [105] as a primary seismic shock and into the strata of the geological formation(s) (not shown) in the immediate area. The primary pressure pulse and the subsequent primary seismic shock are then sensed, recorded and analyzed via seismic sensing and monitoring instrumentation (not shown) to determine the geologic formation, anomalies, and changes in the strata. The seismic sensing and monitoring instrumentation may be located in same wellbore drill string (not shown), on the surface, or in nearby boreholes.

With the flow of the drilling fluid [185] stopped above the gate valve [425] a region of increasing positive pressure is maintained in the upper flow channel [112] as the drilling fluid [185] continues to be pumped downhole into the restricted flow modulator [100]. Accordingly, there is a negative primary pressure created downward from the gate valve [425] and beyond to the base of the borehole due to residual drilling fluid [185] continuing through and exiting into the bottom of the well. This may eventually lead to diverting and reversing the flow of the drilling fluid into the borehole outside the drill collar [105].

Actuation of the gate valve [425] from the open to closed position may occur within 5 milliseconds. This is the result of using drilling fluid [185] under pressure within the small available volume of the pilot flow channel [150] when stopped by the action of the pilot valve [170] to rapidly fill the relatively small main valve pressure chamber [145] thereby moving the gate valve [425] upward and stopping the flow of drilling fluid [185] through the main flow channel [414].

When a signal to the controller (not shown) is provided, the pilot valve [170] moves away from the pilot valve seat [175], releasing contact between the pilot valve face [180] and pilot valve seat [175] such that the pilot valve orifice [160] reestablishes fluid communication between the pilot flow channel [150] and the pilot flow exit passage(s) [165]. Drilling fluid [185] begins to flow out the pilot flow exit passage [165] and into the lower flow channel [114], releasing and equalizing pressure of the drilling fluid [185] within the pilot flow channel [150], valve pressure port(s) [457] and main valve pressure chamber [145]. As the pressure of the drilling fluid [185] equalizes within the main valve pressure chamber [145], the gate valve [425] moves down along the valve actuator guide [447], decreasing the available volume of the main valve pressure chamber [145]. Downward movement of the gate valve [425] releases the contact between the gate face [422] and the gate seat [420] opening the main flow channel [414] and allows fluid communications between the upper flow channel [112] and annular area channel [428]. Opening the main valve channel [414] allows the flow of drilling fluid [185] to pass through the flow modulator [100], reversing the negative pressure build up below the gate valve [425] and below. The restoration of nominal pressures in the drilling fluid [185] creates a secondary pressure pulse(s) and secondary seismic shock(s). The secondary pressure pulse of the drilling fluid [185] is transmitted through the drilling fluid [185] uphole as well as through the drill collar [105] as the secondary seismic shock and into the strata of the geological formation(s) in the immediate area. The secondary pressure pulse and the secondary seismic shock are then sensed, recorded and analyzed via seismic sensing and monitoring instrumentation.

The flow modulator [100] may be used in a drill string to create primary pressure pulse(s) and primary seismic shock(s) and secondary pressure pulse(s) and secondary seismic shock(s) during measurement while drilling (MWD) or just during drilling without the MWD or while there is no drilling being performed.

Figure 5:
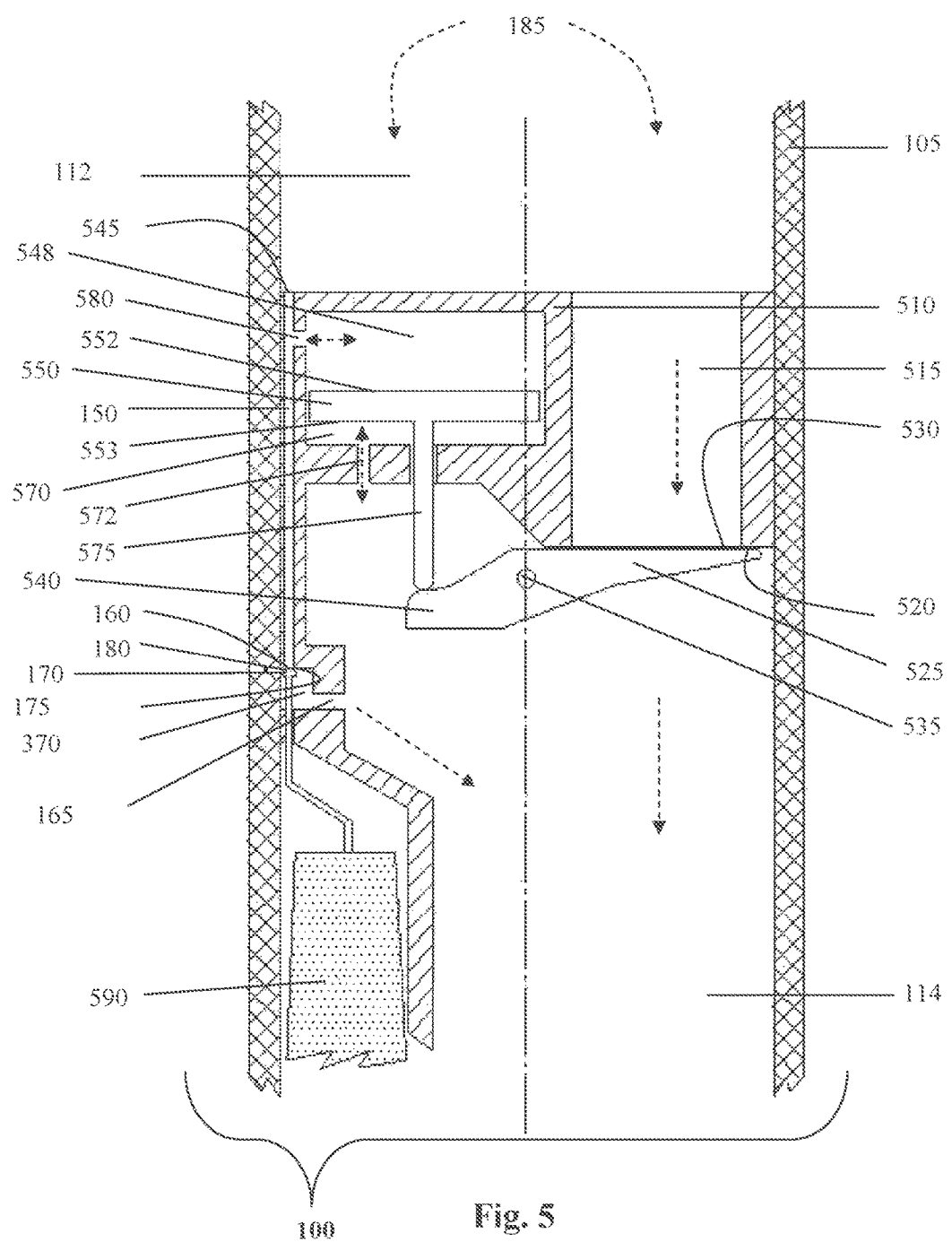
FIG. 5 is a flow modulation device with a flapper valve actuated by a piston to create a primary and secondary pulse within the fluid flowing in a drill string.

FIG. 5 illustrates a drill collar [105] within a borehole with a flow modulator [100]. Beginning at the top of the flow modulator [100] is a piston housing [510], residing under the upper flow channel [112]. Features of the piston housing [510] include a flapper valve orifice [515], which is a passageway in fluid communication between the upper flow channel [112] and the lower flow channel [114]. A flapper seat [520] provides an interfacial area for the flapper valve [525] in a closed position for which the flapper valve face [530] contacts, closes and seals the flapper valve orifice [515] stopping fluid communication between the upper flow channel [112] and the lower flow channel [114].

The flapper valve [525] is pivotably located on an axial centerline of the drill collar [105] within the lower flow channel [114]. On the opposite side of the flapper valve pivot [535] is the flapper valve actuation arm [540]. The flapper valve pivot [535] rotatably attaches the flapper valve [525] to the piston housing [510].

The piston housing [510] has an upper pilot flow inlet [545] in fluid communication with the pilot flow channel [150] and the piston pressure chamber [548]. Within the piston pressure chamber [548] is a piston [550] with an upper piston surface [552]. The pilot flow channel [150] diverts into the pilot valve orifice [160] as the channel is formed by the pilot valve seat [175] and the pilot valve chamber [370]. The pilot valve chamber [370] is in fluid communication with the pilot flow exit passage [165] and the lower flow channel [114]. A pilot valve [170] with a pilot valve face [180] directed toward the pilot valve seat [175] resides within the pilot valve chamber [370]. The pilot valve [170] is connected to the controlling tool [590].

The lower piston surface [553] resides in the piston relief chamber [570] that is in fluid communication with the lower flow channel [114] through a lower piston pressure port [572]. Moving the piston [550] causes a linear change of volume within the piston pressure chamber [548] and the piston relief chamber [570]. The lower piston surface [553] includes a piston rod [575] feature that is in contact with the flapper valve actuation arm [540].

In operation, the flow modulator [100] resides in an annular area of drilling fluid [185] (depicted as flowing from top to bottom of FIG. 5). In the flapper valve [525] opened position (not shown) the drilling fluid [185] flows into and through the upper pilot flow inlet [545], pilot flow channel [150], pilot valve orifice [160] and the pilot valve chamber [370] and into the pilot flow exit passage [165] and then into the lower flow channel [114].

Simultaneously, the drilling fluid [185] flows from the upper flow channel [112], through the flapper valve orifice [515], past the flapper valve [525] into the lower flow channel [114]. In the flapper valve [525] opened position, the piston pressure chamber [548] pressure is lower than the pressure of the drilling fluid [185] flowing past the flapper valve [525] allowing the pressure of the drilling fluid [185] to pivotably urge the flapper valve actuation arm [540] to push the piston rod [575] upward which moves the piston [550] upward decreasing the volume in the piston pressure chamber [548]. This causes the drilling fluid [185] in the piston pressure chamber [548] to exit through the upper piston pressure port [580]. Upward movement of the piston [550] also causes the piston relief chamber [570] to volumetrically expand, drawing drilling fluid [185] from the lower flow channel [114] through the lower piston pressure port [572] and into the piston relief chamber [570]. Movement of drilling fluid [185] into the piston relief chamber [570] assists in keeping the flapper valve [525] opened, maintaining the flapper valve orifice [515] in fluid communication between the upper flow channel [112] and the lower flow channel [114].

As the flapper valve [525], closes, the pilot valve [170] is urged by a controlling tool [590] to move upward, restricting the flow of drilling fluid [185] through the pilot valve orifice [160]. The pilot valve face [180] contacts the pilot valve seat [175] closing off the pilot valve orifice [160], stopping the flow of drilling fluid [185] through the pilot valve orifice [160] and into the pilot flow exit passage [165]. Drilling fluid [185] in the pilot flow channel [150] is then diverted into the upper piston pressure port [580], filling the piston pressure chamber [548] creating pressure within the piston pressure chamber [548] greater than the pressure of the drilling fluid [185] in the flapper valve orifice [515]. As the pressure of the drilling fluid [185] in the piston pressure chamber [548] increases, the pressure increases on the upper piston surface [552] urging the piston [550] and piston rod [575] downward. Downward movement of the piston rod [575] causes the flapper valve actuation arm [540] to move downward and to rotate against the flapper valve pivot [535] urging the flapper valve face [530] to rotate upward against the flapper seat [520] thereby sealing off the flapper valve orifice [515] from the lower flow channel [114].

With the flapper valve orifice [515] closed, drilling fluid [185] ceases to flow from the upper flow channel [112] to the lower flow channel [114] stopping all fluid flow within the flow modulator [100]. Contact between the flapper valve face [530] and the flapper seat [520] also initiates a primary pressure pulse in the drilling fluid [185]. The primary pressure pulse of the drilling fluid [185] is transmitted through the drilling fluid [185] uphole, as well as through the drill collar [105] as a primary seismic shock and into the strata of the geological formation(s) (not shown) in the immediate area. The primary pressure pulse and the subsequent primary seismic shock are then sensed, recorded and analyzed via seismic sensing and monitoring instrumentation (not shown) to determine the geologic formation, anomalies and changes in the strata. The seismic sensing and monitoring instrumentation may be located in the same wellbore drill string (not shown), on the surface or in nearby boreholes. Additionally, the increased pressure within the drill collar [105] straightens the entire drill string and, with the uphole drill string secured, and forces the downhole drill string into the rockface (not shown) thereby assisting with moving the cutting tool (not shown) into the rockface.

With all the flow of the drilling fluid [185] stopped there is a region of high pressure maintained in the upper flow channel [112] as drilling fluid [185] continues to be pumped downhole into the restricted flow modulator [100]. Accordingly, there is a negative pressure created downward from the lower flow channel [114] due to the residual drilling fluid [185] continuing and exiting through the bottom of the well, eventually diverting and reversing the flow into the borehole outside the drill collar [105].

Opening the flapper valve orifice [515] allows the flow of drilling fluid [185] to pass through the flow modulator [100], reversing the negative pressure built up in the lower flow channel [114]. The restoration of nominal pressures in the drilling fluid [185] creates a secondary pressure pulse(s) and secondary seismic shock(s). The secondary pressure pulse of the drilling fluid [185] is transmitted through the drilling fluid [185] uphole as well as through the drill collar [105] as a secondary seismic shock and into the strata of the geological formation(s) in the immediate area. The secondary pressure pulse and subsequent secondary seismic shock are then sensed, recorded and analyzed via seismic sensing and monitoring instrumentation.

Actuation of the flapper valve [525] from the opened to closed position may occur within 5 milliseconds. This is the result of using drilling fluid [185] under pressure within the available small volume of the pilot flow channel [150] which when stopped by the action of the pilot valve [170] rapidly fills the relatively small piston pressure chamber [548], thereby moving the piston [550] downward, as well as moving the flapper valve actuation arm [540] downward, resulting in pivotably moving the flapper valve [525] upward, resulting in closing off the flapper valve orifice [515] and stopping the flow of drilling fluid [185].

The flow modulator [100] may be used in a drill string to create primary pressure pulse(s) and primary seismic shock(s) and secondary pressure pulse(s) and secondary seismic shock(s) during measurement while drilling (MWD) or just during drilling without the MWD or while there is no drilling being performed.

Figure 6:
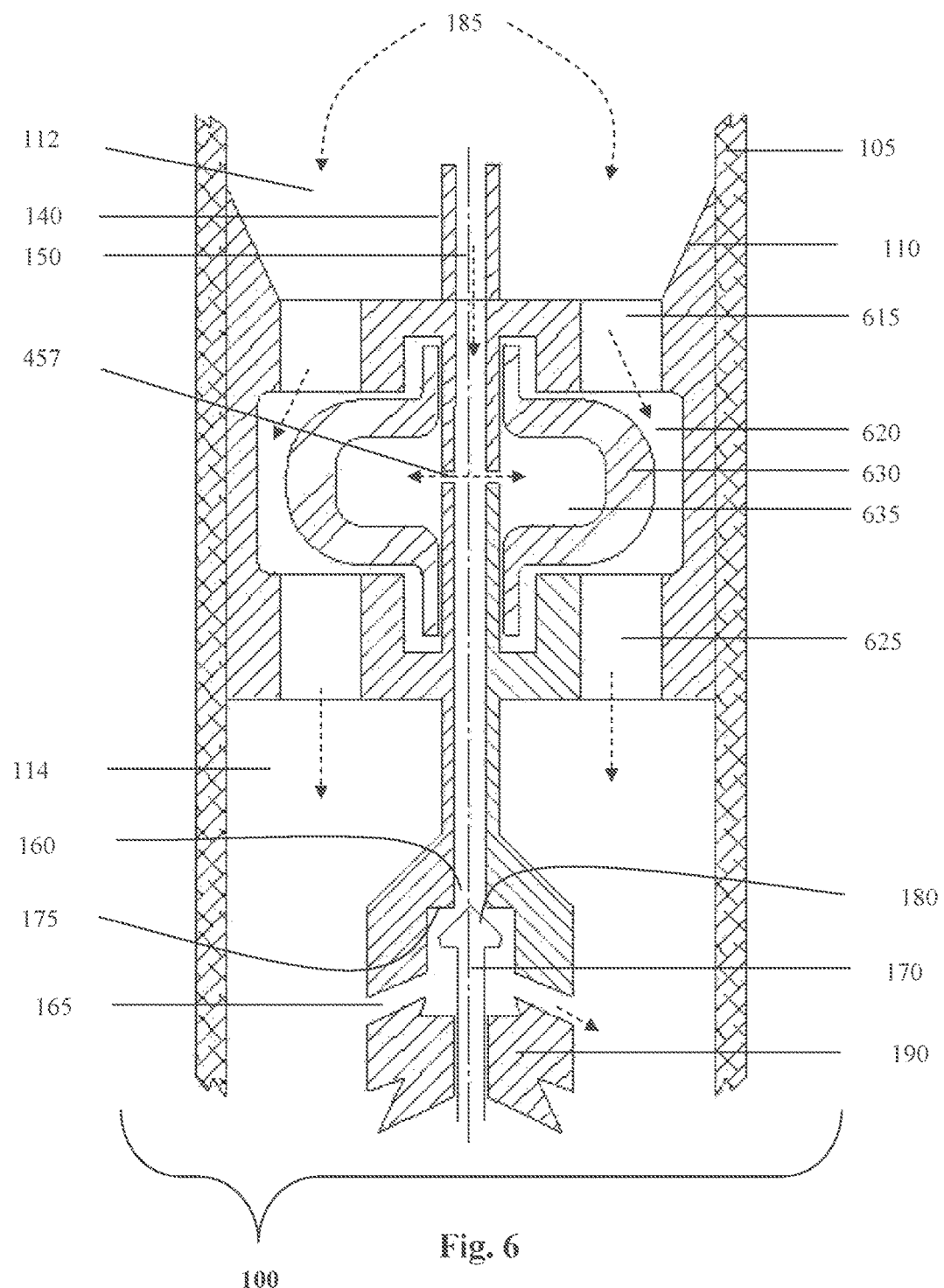
FIG. 6 is a flow modulation device incorporating the hydraulic inflation of a flexible elastomer or balloon like structure to seal off a flow channel.

FIG. 6 illustrates a borehole with a drill collar [105] in which a flow modulator [100] resides. Beginning at the top of the flow modulator [100] and working down, is a flow diverter [110], which is the basis for the upper flow channel [112]. One feature of the flow diverter [110] is a valve inlet [615], which is a passageway for fluid communication between the upper flow channel [112] and the expanding valve flow chamber [620] and a valve outlet [625]. Within the expanding valve flow chamber [620] is the expanding valve [630].

The expanding valve [630] has an internal expanding valve pressure chamber [635] axially located around a pilot flow tube [140], which axially houses the pilot flow channel [150]. The pilot flow tube [140] comprises a valve pressure port [457] in fluid communication between the pilot flow channel [150] and the expanding valve pressure chamber [635]. The pilot flow tube [140] transitions into a pilot valve seat [175] that provides a pilot valve orifice [160] which is in fluid communication with the pilot flow exit passage(s) [165]. The pilot flow tube [140] also provides an interfacial area for the pilot valve [170] in a closed position (not shown) such that the pilot valve face [180] contacts, closes and seals the pilot valve orifice [160] stopping fluid communication between the pilot flow channel [150] and the pilot flow exit passage [165]. The pilot flow exit passage(s) [165] are in fluid communication with the lower flow channel [114].

The expanding valve flow chamber [620] provides an interfacial area in which the expanding valve [630] in an expanded condition (not shown) fills and seals the expanding valve flow chamber [620] stopping fluid communication between the valve inlet [615] and the valve outlet [625].

Operationally, the flow modulator [100] resides in an annular area of drilling fluid [185] (depicted as flowing from the top to the bottom of FIG. 6). In the expanding valve [630] opened position (shown) the drilling fluid [185] flows into and through the upper flow channel [112], the pilot flow channel [150] and the pilot flow exit passage [165] and into the lower flow channel [114].

Simultaneously, the drilling fluid [185] flows into the upper flow channel [112], as formed by the flow diverter [110], past the valve inlet [615], expanding valve flow chamber [620], valve outlet [625], and through to the lower flow channel [114]. In the expanding valve [630] opened position, the expanding valve pressure chamber [635] pressure is lower than the pressure of the drilling fluid [185] allowing the pressure of the drilling fluid [185] to flow through the expanding valve flow chamber [620]. This maintains the expanding valve [630] in a collapsed condition and allows continued flow of drilling fluid [185] in fluid communication between the upper flow channel [112] and the lower flow channel [114].

As the expanding valve [630] is closed, the pilot valve [170] is urged by a controller (not shown) to move upward, restricting the flow of drilling fluid [185] through the pilot valve orifice [160]. The pilot valve face [180] contacts the pilot valve seat [175] closing off the pilot valve orifice [160], stopping the flow of drilling fluid [185] through the pilot valve orifice [160] and into the pilot flow exit passage [165]. Drilling fluid [185] in the pilot flow channel [150] is then diverted into the valve pressure port(s) [457], filling the expanding valve pressure chamber [635] creating pressure within the expanding valve [630] greater than the pressure of the drilling fluid [185] in the expanding valve flow chamber [620]. As the pressure of the drilling fluid [185] in the expanding valve pressure chamber [635] increases, the expanding valve [630] enlarges within the expanding valve flow chamber [620] and the valve inlet [615] is blocked by the expanding valve [630] stopping drilling fluid [185] flow from the valve inlet [615] to the valve outlet [625]. When the valve inlet [615] is blocked, a primary pressure pulse is created in the drilling fluid [185]. All flow of the drilling fluid [185] is stopped within the flow modulator [100] above the expanding valve [630]. The primary pressure pulse of the drilling fluid [185] is transmitted through the drilling fluid [185] uphole, as well as through the drill collar [105] as a primary seismic shock which subsequently reaches the strata of the geological formation(s) (not shown) in the immediate area. The primary pressure pulse(s) and subsequent primary seismic shock(s) are then sensed, recorded and analyzed via seismic sensing and monitoring instrumentation (not shown) to determine the geologic formation, anomalies, and changes in the strata. The seismic sensing and monitoring instrumentation may be located in same wellbore drill string (not shown), on the surface or in nearby boreholes. Additionally, the increased pressure within the drill collar [105] straightens the entire drill string and, with the uphole drill string secured, has a tendency to force the downhole drill string into the rockface (not shown) thereby assisting with moving the cutting tool [190] into the rockface.

When all the flow of the drilling fluid [185] from the surface above the expanding valve [630] is stopped a region of high pressure is formed and maintained in the upper flow channel [112] as drilling fluid [185] continues to be pumped downhole into the restricted flow modulator [100]. Accordingly, there is a negative pressure created as the fluid moves downward from the valve outlet [625] and beyond as residual drilling fluid [185] continues through and exits into the bottom of the well, eventually diverting and reversing the flow of the fluid into the borehole outside the drill collar [105].

Actuation of the expanding valve [630] from an opened to closed position may occur within 5 milliseconds. This is the result of using drilling fluid [185] under pressure within the available small volume of the pilot flow channel [150] which when stopped by the action of the pilot valve [170] rapidly fills the relatively small expanding valve pressure chamber [635] thereby stopping the flow of drilling fluid [185] through the expanding valve flow chamber [620].

When a signal to the controller is sent (not shown), the pilot valve [170] moves away from the pilot valve seat [175], releasing contact between the pilot valve face [180] and pilot valve seat [175] such that the pilot valve orifice [160] reestablishes fluid communication between the pilot flow channel [150] and the pilot flow exit passage [165]. Drilling fluid [185] begins to flow out the pilot flow exit passage [165] and into the lower flow channel [114], releasing pressure of the drilling fluid [185] within the pilot flow channel [150], valve pressure port(s) [ ] and expanding valve pressure chamber [635]. As the pressure of the drilling fluid [185] decreases in the expanding valve pressure chamber [635], the expanding valve [630] collapses, decreasing the size of the expanding valve pressure chamber [635]. The decreased size of the expanding valve [630] allows fluid communications between the valve inlet [615] and valve outlet [625] and through the expanding valve flow chamber [620].

Opening the valve inlet [615] allows the flow of drilling fluid [185] to pass through the expanding valve flow chamber [620], reversing the negative pressure build up in the valve outlet [625] and below. The restoration of nominal pressures in the drilling fluid [185] creates a secondary pressure pulse(s) and secondary seismic shock(s). The secondary pressure pulse of the drilling fluid [185] is transmitted through the drilling fluid [185] uphole as well as through the drill collar [105] providing the secondary seismic shock that reaches into the strata of the geological formation(s) in the immediate area. The secondary pressure pulse and subsequent secondary seismic shock are then sensed, recorded and analyzed via seismic sensing and monitoring instrumentation.

The flow modulator [100] may be used in a drill string to create primary pressure pulse(s) and primary seismic shock(s) and secondary pressure pulse(s) and secondary seismic shock(s) during measurement while drilling (MWD) or just during drilling without the MWD or while there is no drilling being performed.

Figure 7:
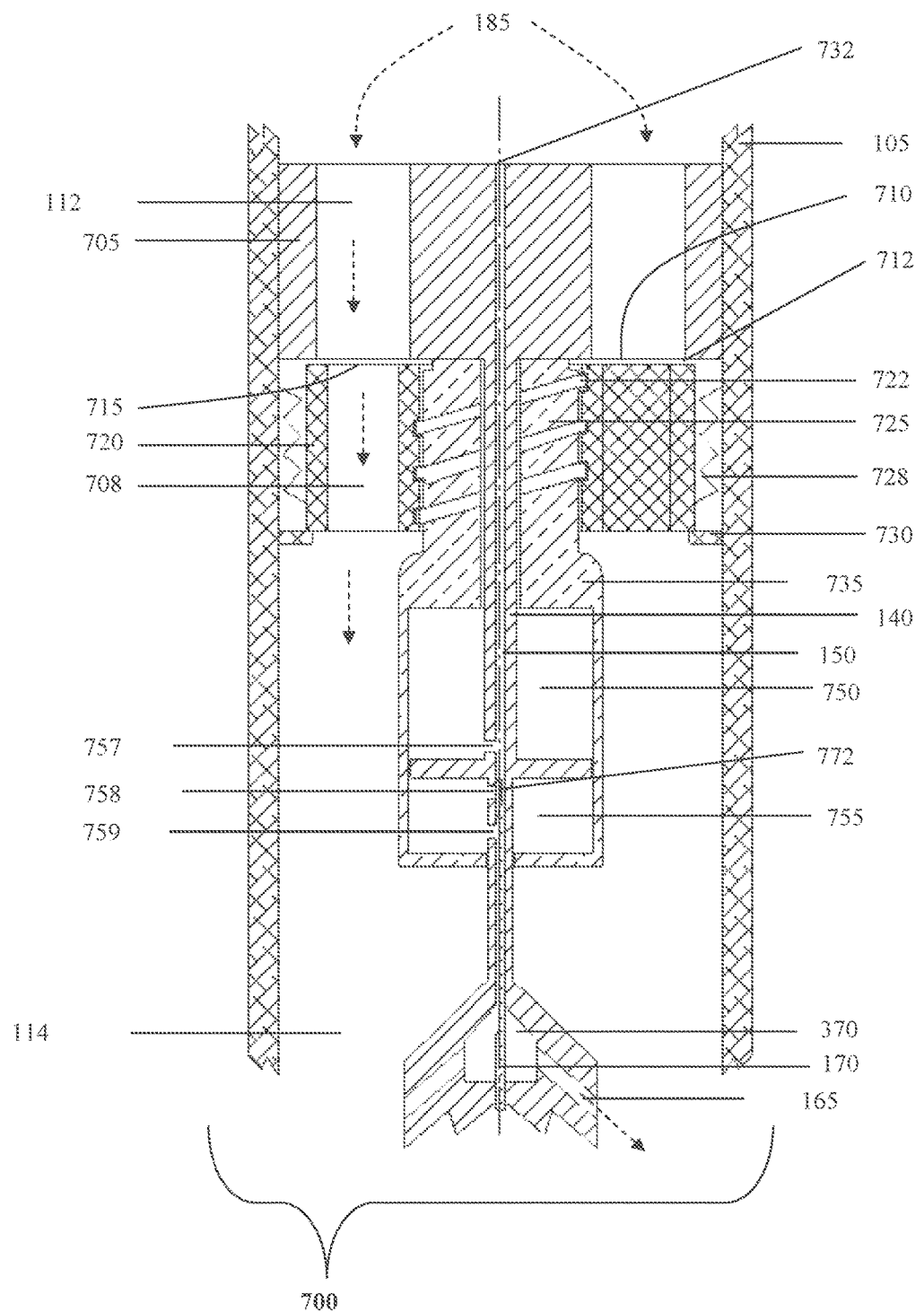
FIG. 7 is a flow modulation device that changes linear movement of an actuator valve into rotational movement of a rotational valve with orifices.

FIG. 7 illustrates that within a borehole is a drill collar [105] in which a flow modulator [100] resides. Beginning at the top of the flow modulator [100] is an upper flow housing [705], which forms the upper flow channel(s) [112]. The upper flow housing [705] as shown from the top has at least one, but typically four or more upper flow channels [112]. At the base of the upper flow channels [112] are flow orifices [710] to allow the upper flow channel(s) [112] to be in fluid communication past the rotating valve seat [712] through holes in the rotating valve face [715] with the rotating valve flow channel(s) [708]. The rotating valve [720] generally forms at least one but typically four or more rotating valve flow channels [708]. The rotating valve [720] has mating threads [722] to mate with, and rotate around, the actuating valve screw [725] and is urged to a resting position by the rotating valve return spring [728]. The rotating valve [720] is held stationary in the axial position by the upper flow housing [705] and the rotating valve support [730].

At the top of the upper flow housing [705] is a pilot flow channel inlet [732] centrally and axially located within the drill collar [105]. The upper flow housing [705] also continues axially through the center of the actuating valve [735] providing a pilot flow tube [140] and pilot flow channel [150]. Located within the actuating valve [735] is the primary pressure chamber [750], secondary pressure chamber [755], primary pressure port [757] and the upper secondary pressure port [758] and a lower secondary outlet port [759].

The pilot flow channel [150] is in fluid communication between the pilot flow channel inlet [732] primary pressure port [757], the upper secondary pressure port [758], lower secondary outlet port [759], the pilot valve chamber [370], the pilot flow exit passage [165] and the lower flow channel [114].

In operation, the flow modulator [100] resides in an annular area of drilling fluid [185] (depicted as flowing from top to bottom of FIG. 7). When the rotating valve [720] is in the closed position (shown on the left side of FIG. 7) the drilling fluid [185] flows into the pilot flow channel [745], out of the secondary pressure chamber [755], out of the lower secondary outlet port [759] into the pilot flow channel [732] flowing to the pilot valve chamber [370], into the pilot flow exit passage [165], and the into the lower flow channel [114]. The drilling fluid [185] flows through the pilot flow channel [745] which can be blocked by the pilot valve [170] which when closed, causes the drilling fluid [185] to fill the primary pressure chamber [750]. The primary pressure chamber [750] has a larger surface area on the top surface resulting in pushing in the upward direction as the pressure of the drilling fluid [185] acting on the area of the rotating valve face [715] causes the actuating valve [735] to move upward and causes the rotating valve [720] to rotate. This action closes the rotating valve face [715], upper flow channel(s) [112], flow orifices [710] and rotating valve flow channel(s) [708], and stopping the flow of drilling fluid [185].

The working theory regarding the flow modulator [100] is that the actuating valve [735] located within a primary position of the pilot valve [170] rotates clockwise, and in a secondary position rotates counter-clockwise. The front portion of the actuating valve screw [725] is at 45 degrees and translates the linear axial movement of the actuating valve

[735] to into rotational movement of the rotating valve [720] which requires that the rotating valve [720] is held stationary in an axial position.

All flow of the drilling fluid [185] is stopped within the flow modulator [100]. The primary pressure pulse of the drilling fluid [185] is transmitted through the drilling fluid [185] uphole, as well as through the drill collar [105] resulting in a primary seismic shock which is then sent into the strata of the geological formation(s) (not shown) in the immediate area. The primary pressure pulse and subsequent primary seismic shock are then sensed, recorded and analyzed via seismic sensing and monitoring instrumentation (not shown) to determine the geologic formation, anomalies and changes in the strata. The seismic sensing and monitoring instrumentation may be located in same wellbore drill string (not shown), on the surface or in nearby boreholes.

When all the flow of the drilling fluid [185] is stopped there is a region of high pressure maintained in the upper flow channel [707] as drilling fluid [185] continues to be pumped downhole into the restricted flow modulator [100]. Accordingly, there is a negative pressure created downward from the rotating valve flow channel [708] and beyond due to the residual drilling fluid [185] continuing to the exit and into the bottom of the well. Eventual diverting and reversing of the flow into the borehole outside the drill collar [105] will occur.

Figure 8A:
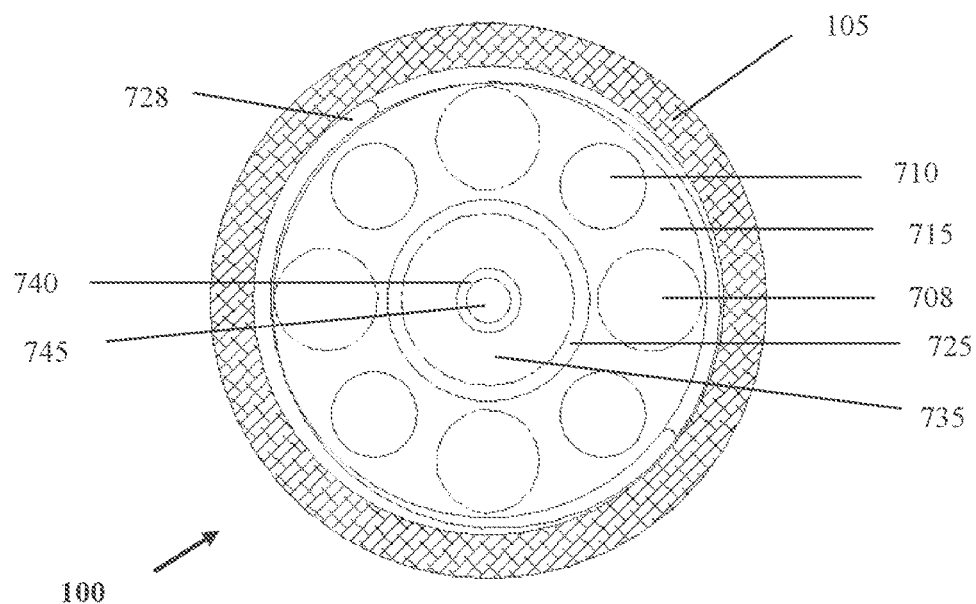
FIG. 8A is a top view of the flow modulation device as described in FIG. 7 in the closed position.

As shown (open) the actuating valve [735] has the rotating valve [720] at the bottom of the actuating valve screw [725] (depending on the orientation of the actuating valve screw [725] whether left hand thread or right hand thread). The left side of the rotating valve [720] (as shown) is aligned with the upper flow channels [707], (as illustrated the right side of the rotating valve [720] is closed (Ref. FIG. 8A), however the flow modulator [100] as shown for illustration purposes is not open and closed at the same time), the flow orifice [710] and the rotating valve flow channel [708] allowing the flow of drilling fluid [185]. As the pilot chamber actuator [772] rotates 180 degrees it closes the lower secondary outlet port [759] to the secondary pressure chamber [755]. Simultaneously the upper secondary pressure port [758] of the secondary pressure chamber [755] is open to the pilot flow channel [745] for drilling fluid [185] to enter from the pilot flow channel [745]. The lower secondary outlet port [759] is closed and the primary pressure port [757] is open. Drilling fluid [185] fills both the primary pressure chamber [750] and the secondary pressure chamber [755], however the secondary pressure chamber [755] has a larger cross sectional area than the primary pressure chamber [750] and exerts a greater pressure moving actuator valve [735] downward resulting in causing the rotating valve [720] to rotate and open the channels by aligning (refer to FIG. 8B) the rotating valve face [715], upper flow channel(s) [707], the flow orifices [710] and the rotating valve flow channel(s) [708], thus permitting the flow of drilling fluid [185]. (The open position is illustrated on the left side of FIG. 7)

Simultaneously, the drilling fluid [185] flows into the upper flow channel [707], past the flow orifice [710], the rotating valve face [715] and into the rotating valve flow channel [708] and through to the lower flow channel [114].

Activation of the actuating valve [735] from the open to the closed position can occur within 5 milliseconds. This is the result of using drilling fluid [185] under pressure within the small volume available within the pilot flow channel [745] such that when the fluid is stopped by the action of the pilot valve [170] to rapidly fill the relatively small primary pressure chamber [750], the actuating valve [735] moves upward, stopping the flow of drilling fluid [185] through the upper flow chamber [707].

Figure 8B:
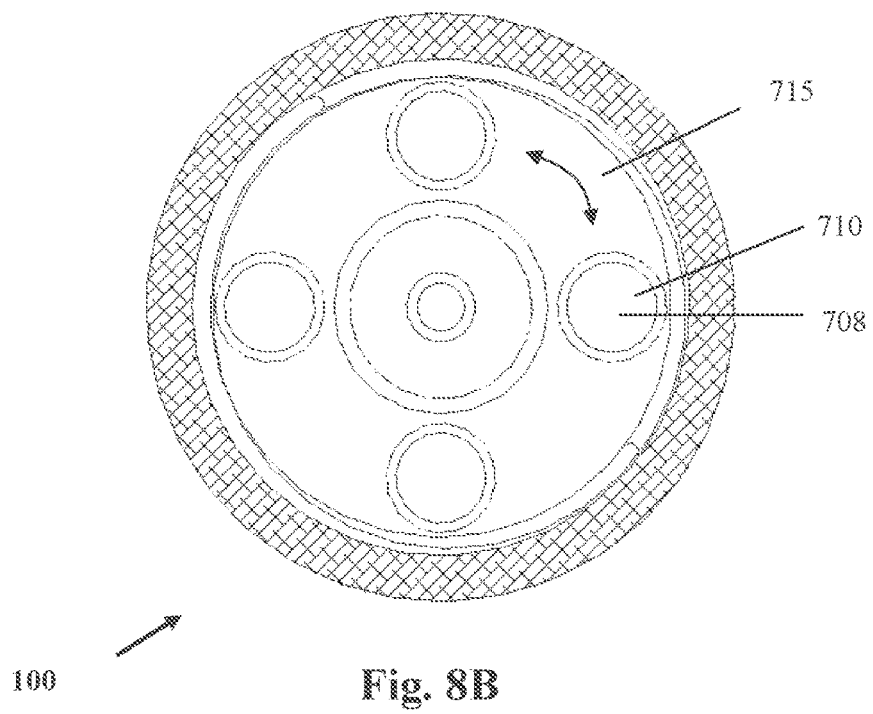
FIG. 8B is a top view of the flow modulation device as described in FIG. 7 in the open position.

FIG. 8A is a top view of the flow modulator [100] in the closed position. The rotating valve face [715] (in this configuration) provides four flow orifices [710] that are not in alignment with the four rotating valve flow channels [708]. The flow orifices are in alignment (but not shown) with the upper flow channel [112] (shown in FIG. 7). Also included are the drill collar [105], the actuating valve screw [725], the actuating valve [735], the rotating valve spring [728], the pilot flow channel [745] and pilot flow tube [140]. The rotating valve return spring [728] may be optional FIG. 8B is a top view of the flow modulator [100] in the open position. The rotating valve face [715] has rotated 90 degrees and aligned the four flow orifices [710] with the four rotating valve flow channels [708] providing a fluid communication between the upper flow channel [112] (shown in FIG. 7) through the flow orifices [710] and the rotating valve flow channels [708].

Figure 9A:
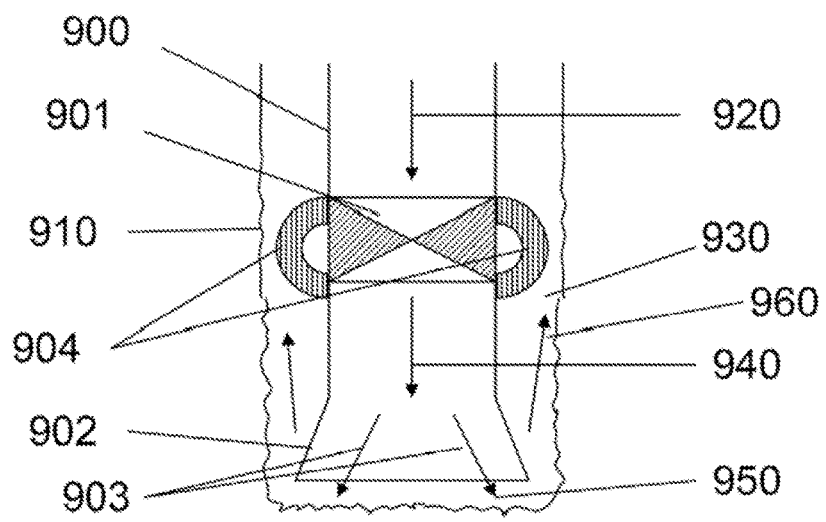
FIG. 9A shows a cross sectional schematic of the drilling operation.

FIG. 9A shows a cross sectional schematic of the drilling operation relating to a further embodiment of the invention. The drill string includes a borehole center pipe [900], a fast acting valve [901], and drill bit [902] with drill bit jets [903] exiting the drill bit [902] and the borehole [910] being drilled. The first constrained moving fluid column [920] allows fluid to pass through the fast acting valve [901], and becomes a second constrained moving fluid column [940] below the valve, allowing fluid to flow through drill bit jets [903] as jetted fluid [950], and allows the fluid to return in the annular area [930]. An optional annular return restrictor [904] may be used for enhancing possible fracturing while drilling.

Figure 9B:
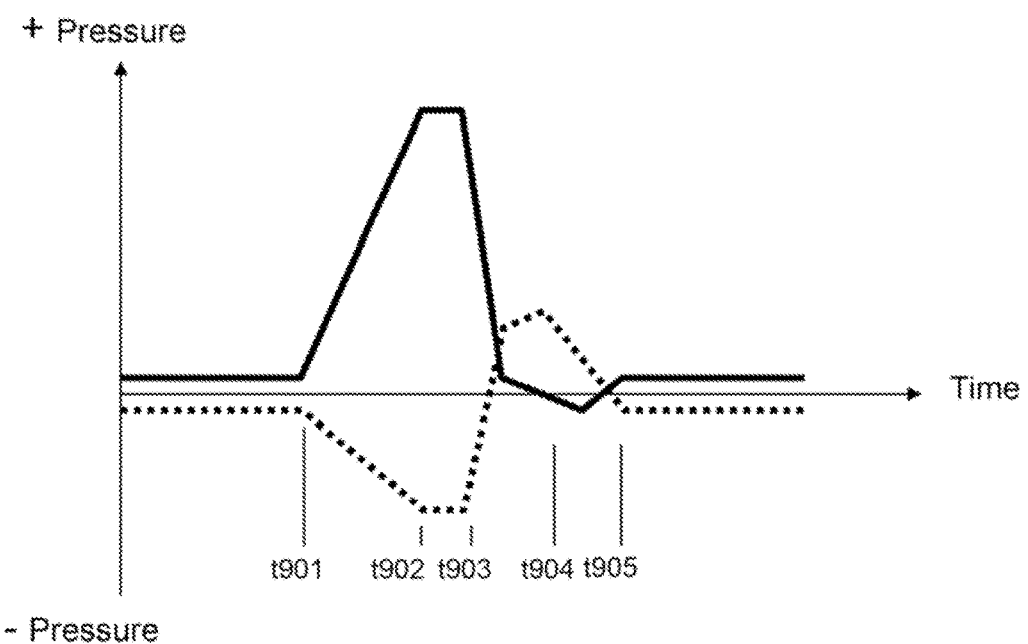
FIG. 9 B is an illustrative figure that indicates exactly how seismic pulses develop by plotting pressure along the y-axis (vertical axis) versus time over two separate locations—a location above and a location below the fast acting valve.

FIG. 9B is an illustrative figure that indicates exactly how seismic pulses develop by plotting pressure along the y-axis (vertical axis) versus time over two separate locations— above and below the fast acting valve. Time along the x-axis (horizontal axis) is represented in distinct intervals as follows; [t901] represents the onset of valve closure, eventually resulting in peak positive pressure at [t902], when the valve is completely closed to the incoming fluid column, followed by the beginning of the valve opening [t903]. Depending on the speed at which the valve opens and how quickly the pressure drops there may be a temporary overshoot [t904] toward a negative pressure reading before the pressure normalizes across the valve. At [t905] the pressure has normalized and returned to steady state.

To describe the exact operation, the borehole [910] is being drilled by the drill bit [902] using any of a variety of conventional drilling methods known in the industry. The first constrained moving fluid column [920] is pumped through the borehole center pipe [900] to remove cuttings from the drill bit [902]. Drill bit jets [903] in the drill bit [902] allow jetted fluid [950] to circulate through the drill bit to wash the cuttings into the annular area [930] and the annular area fluid [960] pushes upward into the borehole [910] being drilled.

The fast acting valve [901] is in the path of the first constrained moving fluid column [920] dividing it into first constrained moving fluid column [920] above the fast acting valve [901] and a second constrained moving fluid column [940] below the fast acting valve [901].

The operating cycle which is represented by the solid line in FIG. 9B begins with fast acting valve [901] beginning to close at time [t901]. Pressure before fast acting valve [901] rises rapidly as shown in FIG. 9B reaching some maximum point near [t902]. The rate of pressure increase is limited only by the speed at which the fast acting valve [901] closes, the compressibility of the moving first and second constrained fluid column(s) [920 and 940, respectively], and the elasticity of the borehole center pipe [900] in the drill string. The fast acting valve [901] can close in milliseconds from the fully opened position to the fully closed position. The pressure increase is due to a "water hammer" effect, well documented and understood in fluid mechanics.

The fluid dynamics involved can be explained as follows; energy in a constrained moving fluid column is converted from kinetic to potential energy as the fluid is forced to decelerate by the fast acting valve [901] closure. The potential energy in the form of momentum and pressure is stored in the high velocity fluid. Due to the: incompressibility of the fluid; the fluid's high velocity; and the relatively large mass of fluid moving through the first and second constrained moving fluid column(s) [920 and 940, respectively] (which is normally thousands of feet long), there is enough kinetic energy in the system to produce thousands of pounds of pressure at the fast acting valve [901].

The pressure on fast acting valve [901] is subsequently mechanically transferred to the drill string or the borehole center pipe [900] through the valve mounting structures. The pressure on fast acting valve [901] applies an axial force to the borehole center pipe [900] effectively stretching the drill string and the borehole center pipe [900] toward the drill bit [902] and the borehole [910], thereby applying more force upon the drill bit [902] and into the end of the borehole [910]. This extra force causes the teeth of the drill bit [902] to jar into and more firmly push into the borehole end and effectively increase rate of penetration of the teeth of the drill bit [902]. It should be noted that the drill bit [902] is optimally continuously engaged with end of borehole [910]. The extra pressure exerted on the drill bit [902] during the closure of the fast acting valve [901] fully engages the drill bit [902].

Peak pressure is reached at some arbitrary time near [t902]. Peak pressure may be reached by various means. If the first and second constrained moving fluid column(s) [920 and 940, respectively] is very short the constrained fluid column(s) may be decelerated completely, effectively stopping the "water hammer" effect. This will happen only when the fast acting valve [901] is held closed (dwell time) longer than time period during which the "water hammer" effect occurs, for a given length of the first and second constrained moving fluid column(s) [920 and 940, respectively]. Most drilling operations have sufficient first and second constrained moving fluid column(s) [920 and 940, respectively] so that the "water hammer" effect occurs over the entire dwell time during which the fast acting valve [901] remains closed.

Peak pressure may also be reached when the fast acting valve [901] reaches the designed pressure limit. In this case the valve opens a small amount to limit the maximum pressure.

Peak pressure may also be defined as the point at which the fast acting valve [901] is opened. In this case the pressure would still be increasing. This could occur in long reach, low depth, horizontal drilling operations, where the first and second constrained moving fluid column(s) [920 and 940] includes a large amount of compressible air.

The operating cycle continues with the fast acting valve [901] beginning to open at time [t903]. Pressure above the fast acting valve [901] drops rapidly as shown plotted in FIG. 9B and as shown reaching some minimum point before or at time [t904]. The rate of pressure decrease is limited only by the speed of the fast acting valve [901] opening, the open area defined above the fast acting valve [901], and the lower pressure related to the open area below the fast acting valve [901]. The fast acting valve [901] can open in milliseconds from a fully closed to a fully opened position.

When the fast acting valve [901] opens, the potential energy stored above and below the fast acting valve [901] is suddenly released, creating a shock wave of pressure into the second constrained moving fluid column [940] below the valve, and the shock wave continues within the fluid toward and through the drill bit jets [903], and the annular area fluid [960] in the annular area [930], resulting in the pulsed wave as plotted in the dotted line, represented in FIG. 9B, indicating the pressure pulses that occur below the fast acting valve [901] after time [t903]. The operating cycle ends when the pressures normalize and the fast acting valve [901] is opened.

In a preferred embodiment, the pulse amplitude above the fast acting valve [901] is very large—in the order of magnitude of hundred to thousands of pounds per square inch whereas pressures occurring below the fast acting valve [901] are generally lower and seldom would reach more than a few hundred pounds per square inch. The pulse width generated and desired is as narrow as possible to accommodate the elasticity of the fluids and the operating time of the valve. Pulse widths of 200 to 400 milliseconds are normal.

The pulse chosen should be large and fast so that most of the energy is imparted into the formation requiring less energy be withdrawn from the hydraulic valve system of the present application.

This same pressure shock wave is applied to the formation by selecting larger jets. The formation receives pressure shocks which impart energy into the formation producing a seismic pulse which is measured at any point within the existing well, in adjacent wells, or at the surface.

These pressure pulses cause very high instantaneous flow through the drill bit jets [903]. This high flow, in addition to creating a seismic wave, allows for cleaning cuttings from the borehole [910] and drill bit [902], enhancing the drilling rate, clearing bit balling, and cleaning the bit cutters.

Figure 10:
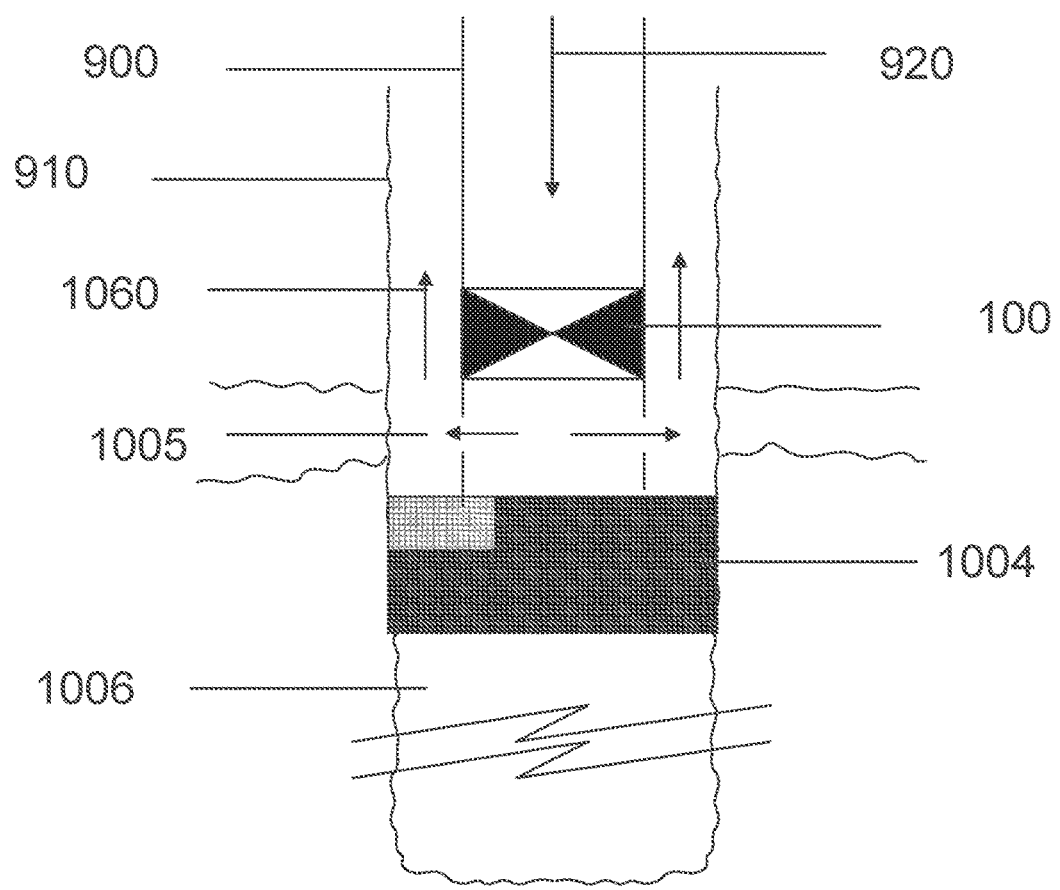
FIG. 10 provides a schematic of the drilling fluid flowing downward through the center pipe past the flow modulator through ports on either side of the center pipe.

FIG. 10 provides a schematic of the first constrained moving fluid column [920] flowing downward through the borehole center pipe [900] past the flow modulator [100] through ports [1005] on either side of the borehole center pipe [900]. The upward fluid flow [1060] is directed upward through the annular area [930] next to the formation [1006]. When the flow modulator [100] is closed, a primary pulse is generated that is directed uphole through the borehole center pipe [900] in the borehole [910] and a secondary pulse is directed downward and then out through the ports [1005] and into the formation [1006]. The secondary pulse is directed through the ports [1005] because the first constrained moving fluid column [920] flow is restricted from going downhole by a plug [1004], which can be moved up or down in the borehole [910] to any desired location.

In another embodiment, the fluid flow is directed in an opposite direction so that the flow is provided down an annular area between the center pipe and the formation [1006] and then returns back up through the center of the borehole pipe past the inverted flow throttling device (IFTD).

Figure 11:
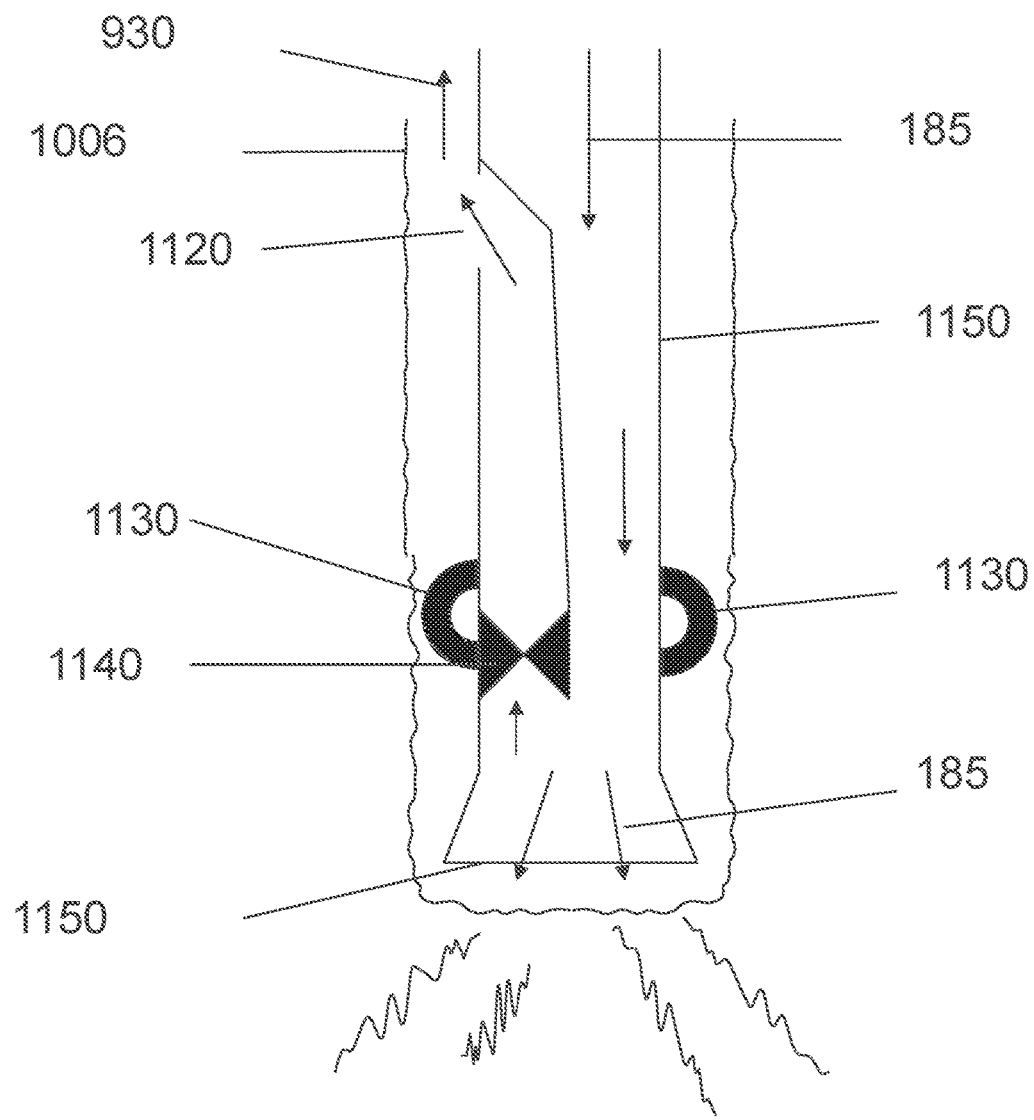
FIG. 11 is a schematic indicating drilling fluid flowing down the seismic pulse generating pipe.

FIG. 11 is another schematic indicating drilling fluid [185] flowing down the seismic pulse generating pipe [1150]. This configuration shows the bottom of the seismic pulse generating pipe [1150] and drilling fluid [185] reaching the bottom of the seismic pulse generating pipe [1150], it is redirected back uphole through the inverted flow throttling device (IFTD) [1140] and then passes through side channel [1120] into an annular area [930] and eventually back uphole. When the IFTD [1140] is closed, the primary wave generated (with the pulse magnitude of a water hammer pulse) is redirected downhole so that the seismic wave generated has greater resolution at deeper depths than can be generated from other conventional seismic generators located either downhole or on the surface. When there is fluid flow in the wellbore, the bladders [1130] are expanded due to the increased pressure caused by the fluid flow forced into the bladders [1130]. The bladders [1130] are filled in the same manner as fluid filling a balloon, thus causing a seal between the seismic pulse generating pipe [1150] and the formation [1006]. This seal restricts the flow and the pressure waves so they are focused downwards towards the bottom of the seismic pulse generating pipe [1150] which may or may not be perforated.

Figure 12:
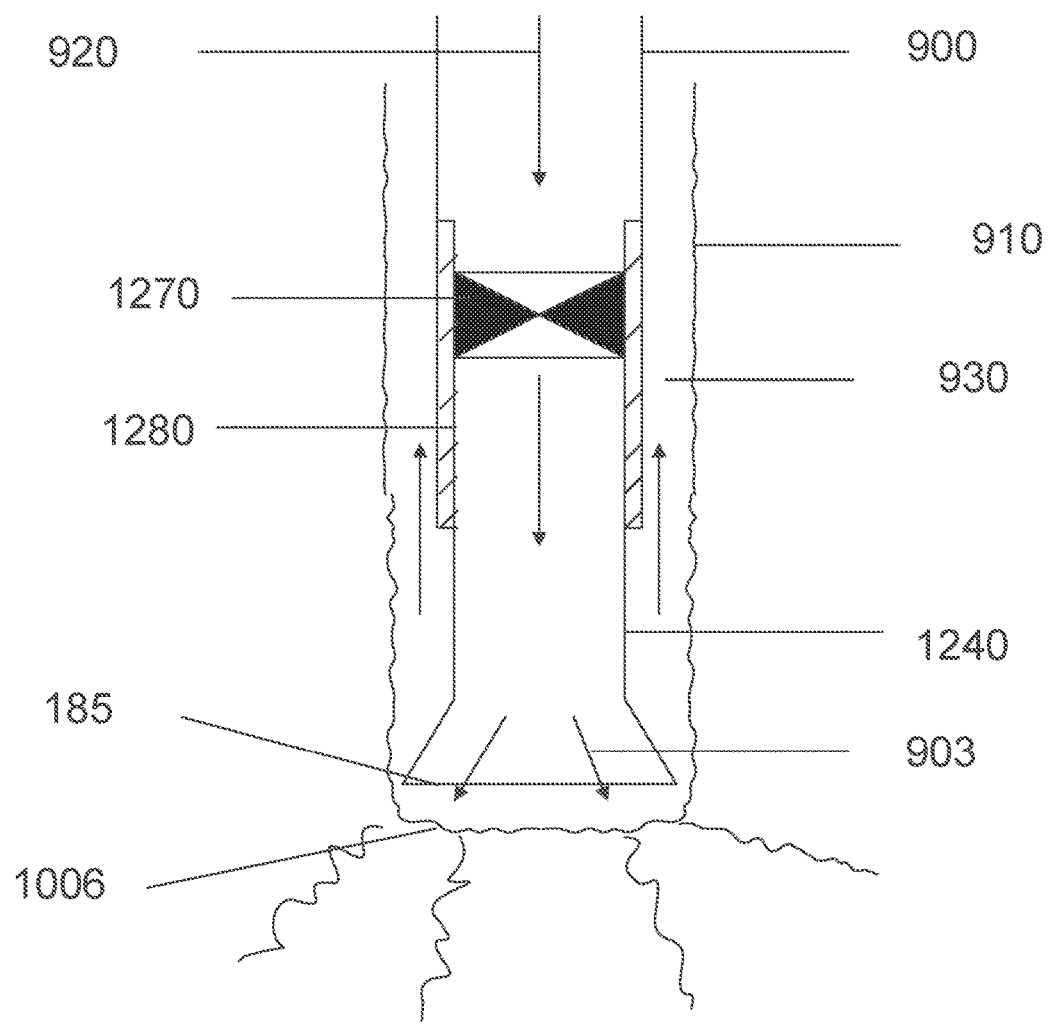
FIG. 12 depicts a telescoping sliding assembly situated inside the borehole tubing.

FIG. 12 depicts a telescoping sliding assembly situated inside the borehole [910]. The downhole borehole center pipe [900] mates at the bottom end with a Telescoping Sliding Assembly (TSA) [1240] which is allowed to move axially a limited amount within the downhole borehole center pipe [900] but restricted from rotating with respect to the downhole borehole center pipe [900], rotating together with the downhole borehole center pipe [900]. When the first constrained moving fluid column [920] is unrestricted, the Telescoping Sliding Assembly (TSA) [1240] is held pushed up against the downhole borehole center pipe [900] using supporting springs [1280] that support the weight of the TSA [1240]. The drilling fluid [[185] is exiting through the drill bit jets [903] or openings in the TSA [1240] and is redirected upon impact with the formation [1006] to return through the annular area [930] to the surface. When the FTD [1270] closes, the increase fluid pressure in the first constrained moving fluid column [920] above the FTD [1270] increases and applies downward force on the FTD [1270] which is within and attached to the TSA [1240] causing the TSA [1240] and the attached drill bit jets [903] to impact the formation [1006] thus creating a seismic shock wave in the formation [1006]. Since the downward force created by the stopped first constrained moving fluid column [920] is greater than the weight of the TSA [1240], it overcomes the supporting spring [1280] force supporting the TSA [1240]. The drill bit jets [903] or bottom end of the TSA [1240] actually does not lift off the formation [1006] but the additional downward force applied to the TSA [1240] from the closing of the FTD [1270] pushes only the TSA [1240] including the drill bit jets [903] with the additional force down and does not have to stretch more the entire length of the already stretched downhole borehole center pipe [900]. When the FTD [1270] opens, the supporting spring [1280] supports the weight of the TSA [1240] and the drill bit jets [903] and the additional downward force that created the seismic shock is relieved and the fluid flow and pressures normalize.

Figure 13:
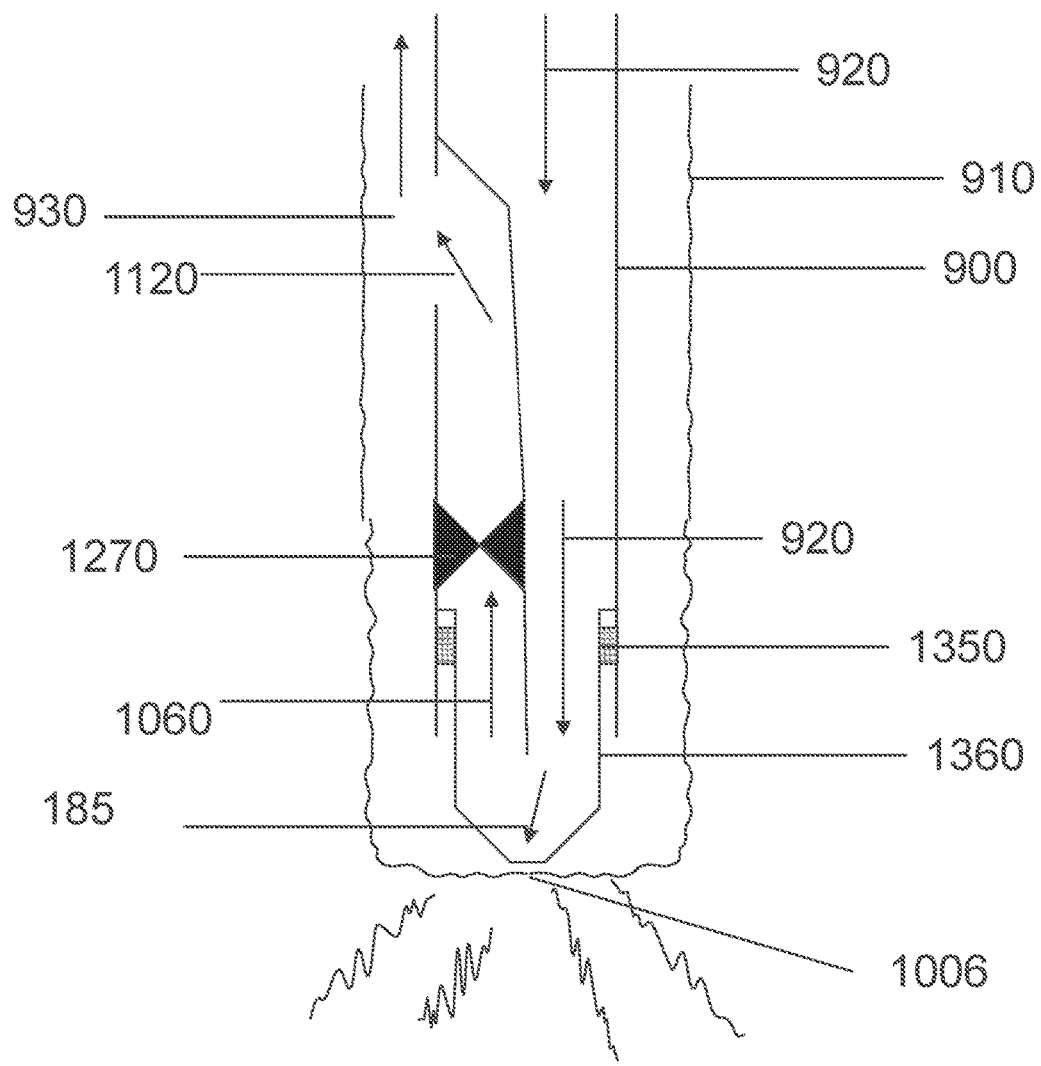
FIG. 13 is a schematic of a water hammer fracturing device depicted as a downhole pipe with a sliding and sealed end at the bottom of the borehole.

FIG. 13 is a schematic of a water hammer fracturing device depicted as a downhole borehole center pipe [900] with a sliding and sealed end including a sliding hammer [1360] at the bottom of the borehole [910]. The first constrained moving fluid column [920] is pumped down the center of the borehole center pipe [900]. The bottom of the first constrained moving fluid column [920] is directed to one side of the borehole center pipe [900] and enters the sliding hammer [1360] at the end of the borehole center pipe [900] and bottom of the borehole [910]. The drilling fluid [185] inside the sliding hammer [1360] is then redirected as an upward fluid flow [1060] away from the bottom of the pipe into and through the Flow Throttling Device (FTD) [1270] and then passes through side channel [1120] into and upward through the annular area [930] back to the surface. The sliding hammer [1360] is allowed to slide axially in the borehole center pipe [900] and not allowed to exit or separate from the borehole center pipe [900]. The sliding surface is sealed [1350] to prevent fluid flow and allow for pressure bypass. When the FTD [1270] is open, the constrained fluid column [1310] flows through the borehole center pipe [900] and the bottom of the constrained fluid column [1340] flows around the FTD [1270] so that the fluid [1345] is redirected inside the sliding hammer [1360] upward and through the FTD [1270] and then out the side channel [1120] into the annular area [930] and back up to the surface. A seismic wave is generated by momentarily stopping the upward fluid flow [1060] through the FTD [1270] When the FTD [1270] is closed, the flow through the FTD [1270] is restricted and momentarily stopping the upward fluid flow [1060] and backing up fluid [1345] into the inside chamber of the sliding hammer [1360] restricting the downward flow of the constrained fluid column(s) [1340 and 1310] causing the pressure increase in fluid [1345] inside the sliding hammer [1360]. As fluid is stopped to flow through FTD [1270] fluid downstream [1355] of FTD [1270] is reduced in pressure causing negative pressure change outside of sliding hammer [1360]. This pressure differential of increased pressure inside and reduced pressure outside of the sliding hammer [1360] causes the sliding hammer [1360] to move axially downward into formation [1006] with an added force resulting in increased seismic waves applied to formation [1006]. The magnitude and its amplitude is dependent on how quickly the valve is closed, opened, its dwell time, frequency, and the flow velocities. When the FTD [1270] opens, the upward fluid flow [1060] flow through the FTD [1270] resumes and the pressures in and across the device normalize.

Figure 14:
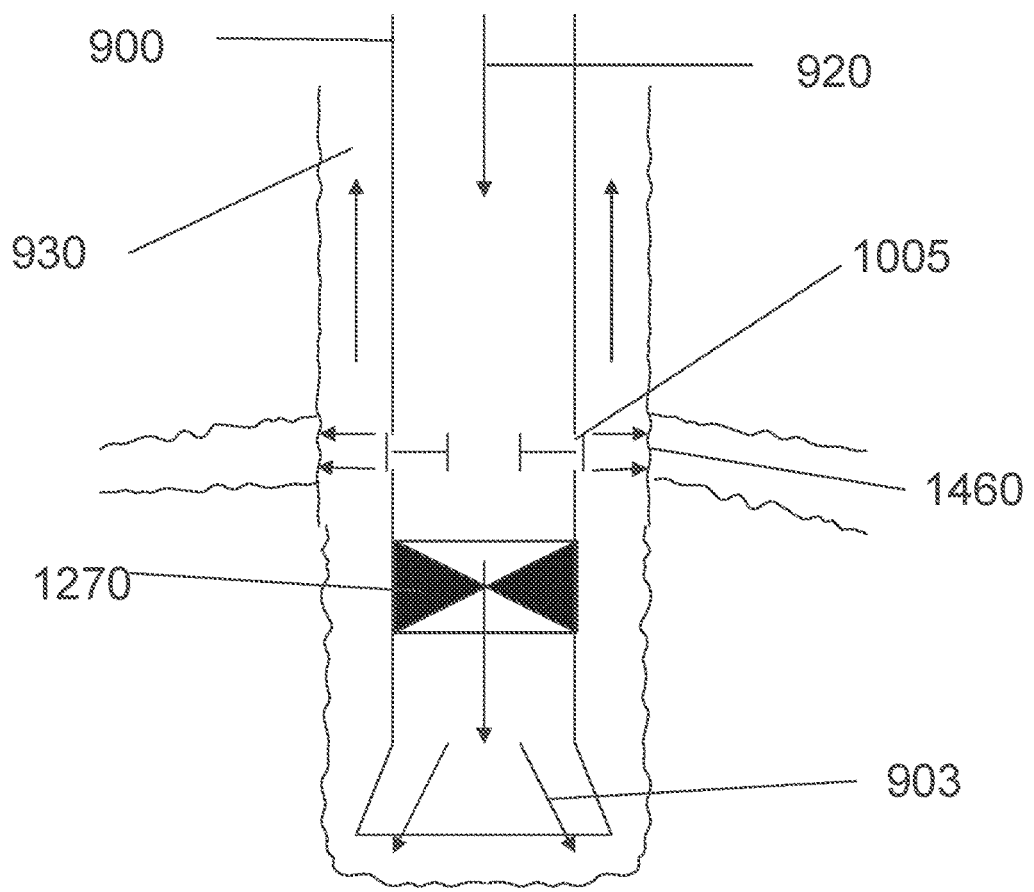
FIG. 14 depicts a seismic pulse generator that can be used during the drilling operation due to the fact that it is similar to the original FTD design with the additional inclusion of ports or a funnel above the FTD.

FIG. 14 depicts a seismic pulse generator that can be used during the drilling operation due to the fact that it is similar to the original FTD [1270] design with the additional inclusion of ports [1005] or a funnel [1460] above the FTD [1270]. The first constrained moving fluid column [920] is pumped downhole either during or after the drilling operation through the borehole center pipe [900] and through the FTD [1270] and exits through the bottom of the pipe or drill bit jets [903] and back up an annular area [930] to the surface. When the FTD [1270] is closed, the seismic wave generated above the FTD [1270] and directed back uphole is diverted by the funnel [1460] and/or ports [1005] laterally towards the formation [1006] so as to direct the seismic wave radially outward. Additionally, the seismic wave generated below the FTD [1270] is directed downward and is of smaller magnitude than the wave generated above the FTD and its amplitude is dependent on how quickly the valve is opened, the dwell time, frequency, and the flow velocities. The usefulness of the wave generated above the FTD [1270] is that it allows for characterization of the formation [1006] radially, whereas the wave generated below the FTD [1270] will provide better information regarding the geologic information below the drill bit jets [903].

Figure 15:
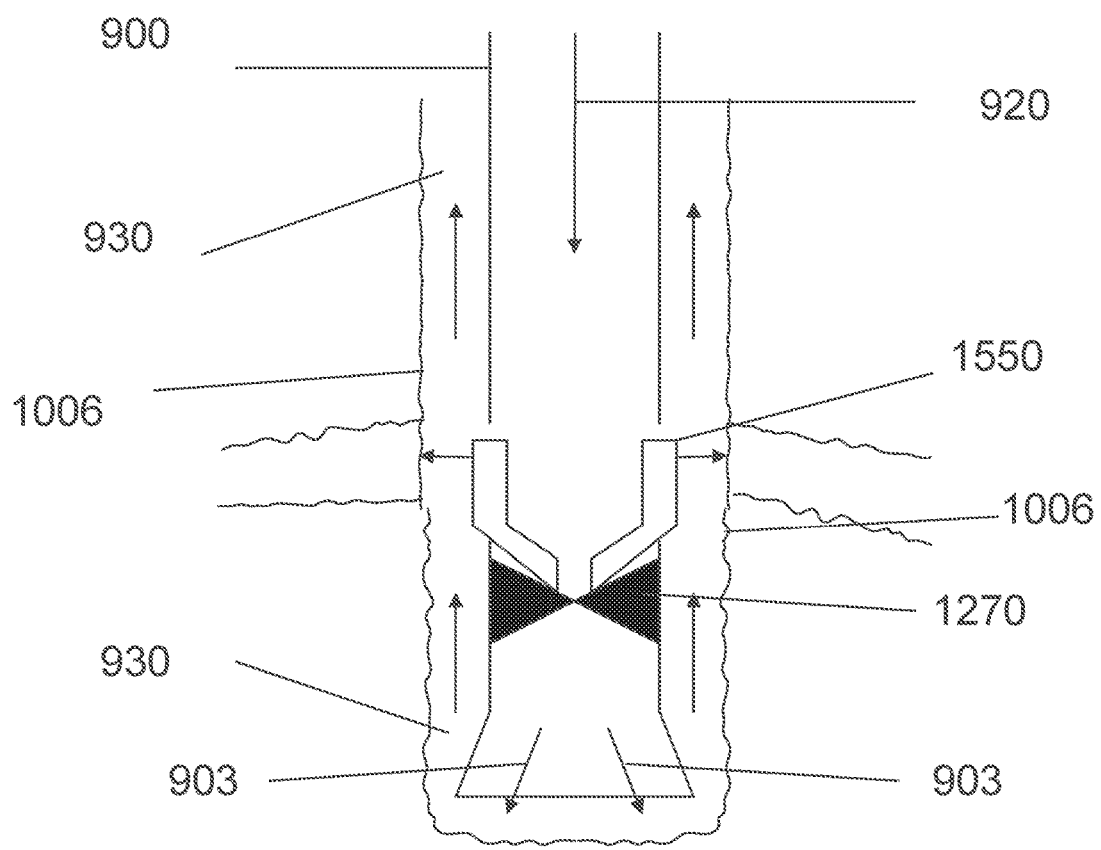
FIG. 15 illustrates another version of a mechanical seismic hammer operation which is similar to the seismic pulse generator design shown in FIG. 14.

FIG. 15 illustrates another version of a mechanical seismic hammer operation which is similar to the seismic pulse generator of FIG. 14. In this case, the seismic pulse generator incorporates a mechanically operated hammer as part of a section connected to and above the FTD [1270]. The first constrained moving fluid column [920 is pumped downhole either during or after the drilling operation through the borehole center pipe [900] and through the FTD [1270]

when in the open position and exits through the bottom of the pipe or drill bit jets [903] and back up the annular area [930] to the surface. When the FTD [1270] is closed, the FTD [1270] mechanically moves the mechanically operated hammer [1550] that is part of and located above the FTD [1270] and in a very fast moving action moves the mechanically operated hammer [1550] head laterally towards the formation [1006] so as to direct the seismic wave radially outward. At the time the FTD [1270] closes and moves the mechanically operated hammer [1550] the flow below the FTD [1270] is stopped and a negative pressure (seismic) wave is generated. The negative pressure wave generated below the FTD [1270] is directed downward and is of smaller magnitude than that of the wave generated above the FTD [1270] and its amplitude is dependent on how quickly the valve is closed, opened its dwell time, frequency, and the flow velocities. The usefulness of the radial seismic wave generated by the mechanically operated hammer [1550] above the FTD [1270] is to characterize the formation [1006] radially whereas the pressure wave generated below the FTD [1270] will provide information regarding the geologic information below the bit.

Figure 16:
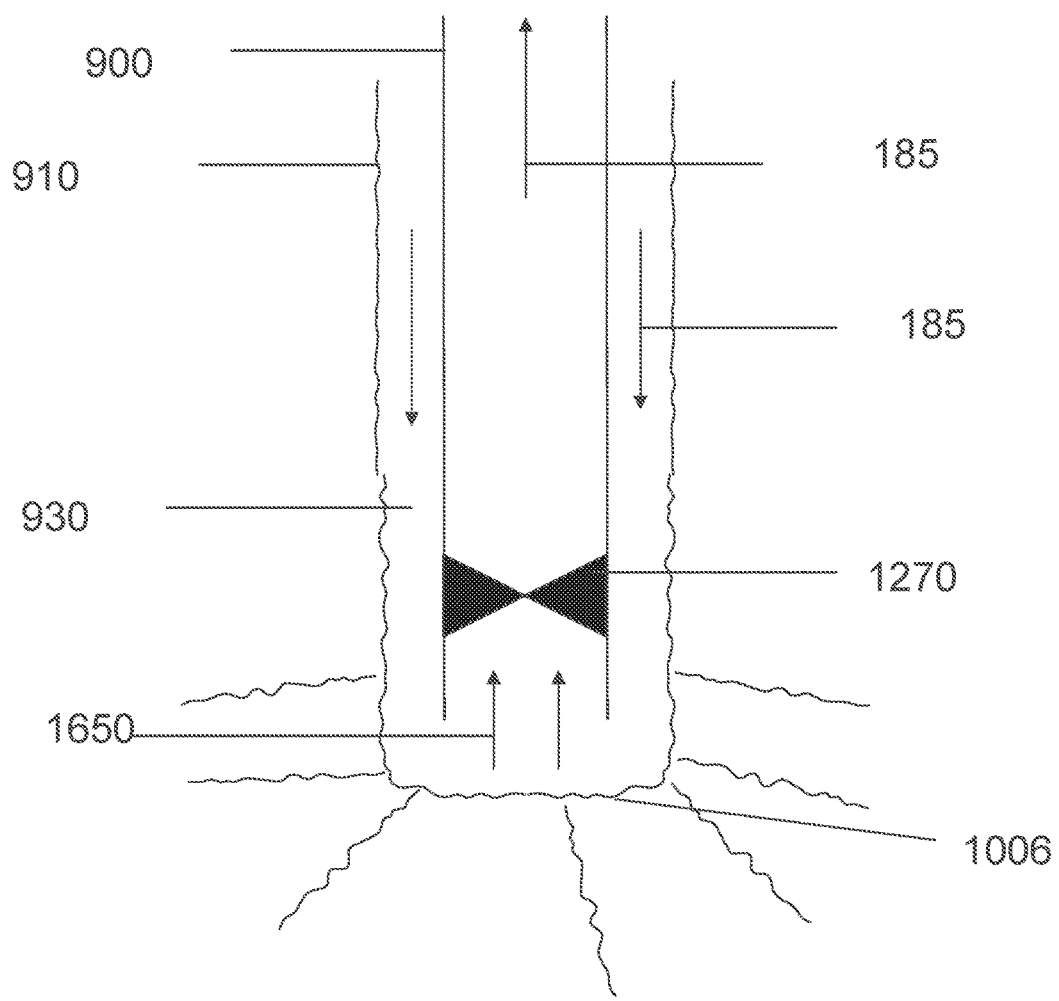
FIG. 16 depicts a Flow Throttling Device (FTD) inside and at the bottom of a downhole pipe within a wellbore or casing.
Figure 17:
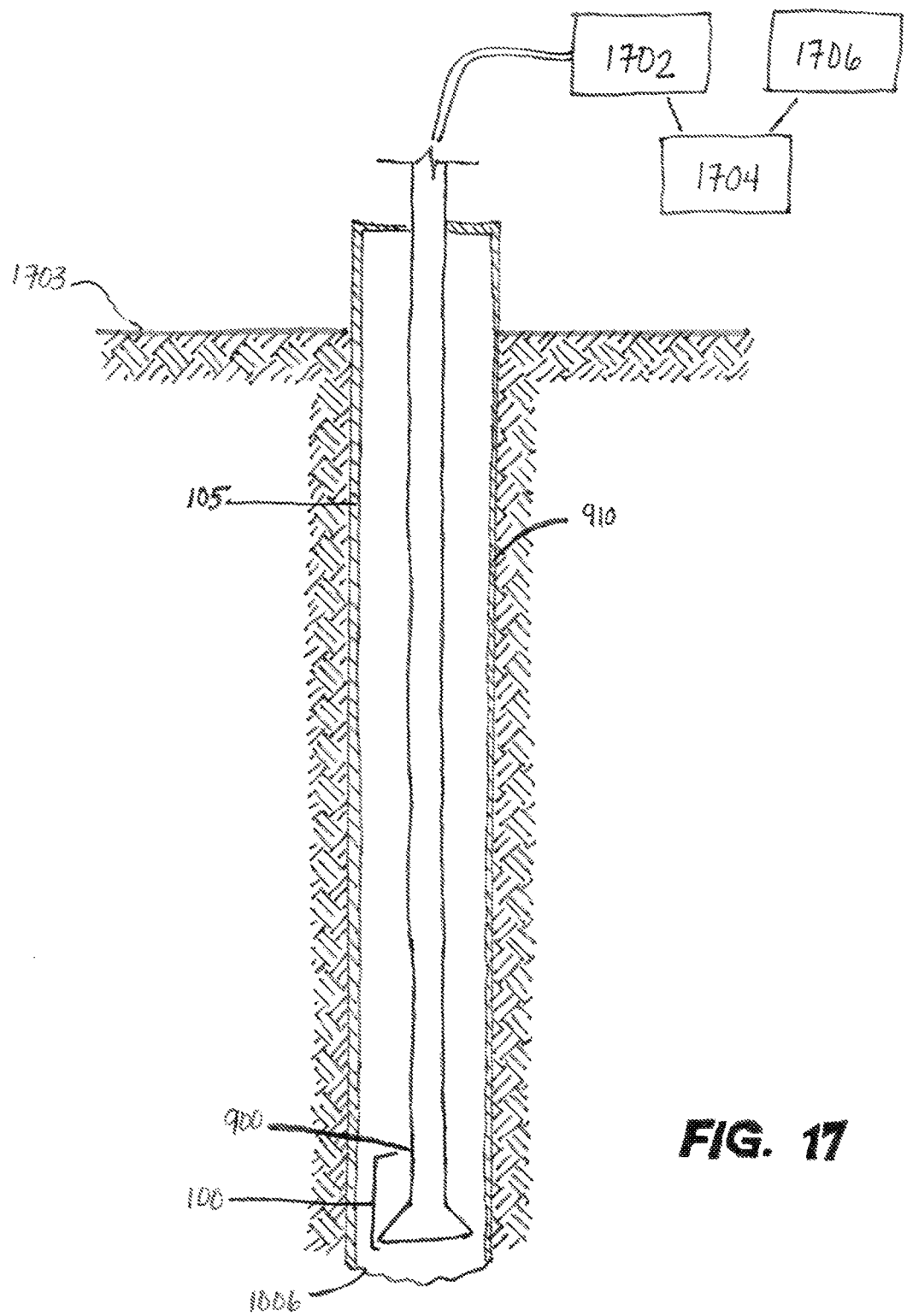
FIG. 17 is a schematic diagram of a well according to an embodiment of the invention.

FIG. 16 depicts a Flow Throttling Device (FTD) [1270] inside and at the bottom of a borehole center pipe [900] within the borehole [910]. The drilling fluid [185 is pumped down from the surface in the annular area [930] to the bottom of the formation [1006] where the drilling fluid [1185] is redirected upward into the borehole center pipe [900] through the opened Flow Throttling Device (FTD) [1270], allowing the drilling fluid [185] to flow back to the surface. When the FTD [1270] is closed in a controlled manner, the drilling fluid [185] flow up through the FTD [1670] is stopped, which causes backing up of the flowing drilling fluid [185] into the formation [1006] thus creating seismic shock waves. The magnitude of the shock wave is dependent on how quickly the FTD [1270] is closed and opened, its dwell time, frequency, and the flow velocities. When the FTD [1270] is opened, allowing drilling fluid [185] to flow upward and through the borehole center pipe [900] back to the surface, the pressure and the flow becomes normalized above and below the FTD [1270]. This allows for relieving pressure within the formation [1006] such that the fluid can be readied for the next seismic wave to be generated. FIG. 17 provides the example of one seismic sensing device [1702] located on the surface [1703] of the formation for receiving seismic waves; a recording device [1704] for recording the signals received by the seismic sensing device(s) [1702]; and an analysis system [1706] for analyzing the primary and secondary seismic waves and determining the location of the SPG. This example provides at least one seismic sensing device [1702] is used to sense and record the primary and secondary seismic wave(s), or associated waveform(s) at the surface [1703] of the borehole [910] for correlation with a reference signal, a multiplicity of repetitive initial and subsequent seismic wave(s), and/or multiple seismic sensing devices at a multiplicity of locations (such as a grid of seismic sensors).

It is not intended that the flow modulator and seismic source generator system described herein should be limited to the descriptive applications previously disclosed.

The invention claimed is:

1. A seismic profiling system that obtains information regarding a geological formation traversed by a borehole having drilling fluid therein, said system comprising:
one or more controllable downhole seismic pulse generator(s) (SPG) further comprising drill string tool(s), said drill string tool(s) coupled to said formation, a seismic pulsing device attached to a portion of a drill string of said drill string tool(s) wherein said pulsing device comprises a fluid modulator with an actuator that drives a valve, and a valve controller to control said valve such that when said valve is initially in an open position, flow of the a drilling fluid passes through said seismic pulse generator such that a seismic signal is generated when one or more valves that generate seismic pulses is initially closed and subsequently opened such that operation of said valves create a primary wave and simultaneously create a secondary wave wherein as said drilling fluid in a main valve pressure chamber increases, a main valve moves downward along a pilot flow tube toward a main flow orifice and a main valve seat such that movement of said main valve allows maintenance of constant pressure under volumetric expansion wherein said seismic signal comprises said primary wave and said secondary wave transmitted through said drilling fluid uphole as well as through a drill collar.

2. The seismic profiling system of claim 1, wherein said primary wave comprises a positive initial pressure pulse and a subsequent negative pressure pulse above said valve and wherein said secondary wave comprises a negative initial pressure pulse with a subsequent positive pressure pulse below said valve and an amplitude of said primary wave and said secondary wave is determined by a length of time that said valves are opened and closed; frequency of opening and closing said valves; and speed at which said valves are opened or closed thereby providing said seismic signal capable of creating a pressure pulse of at least 200 pounds per square inch.

3. The seismic profiling system of claim 2, wherein a mechanical advantage is accomplished by closing an inner valve that engages said actuator causing closing of an inner flow channel and redirecting drilling fluid into a valve housing such that when said valve closes said drilling fluid is sealed off from below said SPG, thus creating a seismic wave.

4. The seismic profiling system of claim 3, wherein said primary wave and said secondary wave is generated from downhole, while drilling, propagates in all directions depending on location within said formation, thereby providing a signal resolution that precisely defines and locates said formation.

5. The seismic profiling system of claim 2, comprising one or more geophones, hydrophones or seismic sensing devices for receiving seismic waves, located in all of the following locations; on or near a surface of said formation, within said borehole, and/or nearby boreholes, and/or on said drill string; a recording device for recording signals received by said geophones, hydrophones, or seismic sensing devices, and; an analysis system for analyzing said primary and secondary seismic waves.

6. The system of claim 1, wherein said actuator is a motor, a solenoid, a torquer, a piezoelectric drive, a magnetostrictive drive, hydraulic drive, or a pneumatic drive.

7. The system of claim 1, wherein said valve controller is connected to said actuator and wherein said valve controller through said actuator is equipped with electro-mechanical capability that opens and closes said valve within desired intervals, rates, and amplitudes.

8. The system of claim 1, wherein said system provides seismic pressure pulses of a desired and specific amplitude and frequency and width such that control of a flow modulator produces said primary and secondary seismic waves.

9. The system of claim 8, wherein said pulse amplitude, frequency, and width are developed by seismic pressure pulses wherein said seismic pressure pulses developed are greater than 500 psi and wherein said flow modulator is closed within 50-150 milliseconds.

10. The system of claim 8, wherein said flow modulator is held open for no less than 50 milliseconds and up to 5 seconds.

11. The system of claim 8, wherein said flow modulator resides in an annular area of drilling fluid and comprises a flow diverter as a basis for an upper flow channel and wherein said flow diverter comprises a main flow orifice that is a passageway in fluid communication between said upper flow channel and a middle flow channel and a main valve seat, wherein said main valve seat provides an interfacial area for the main valve when said main valve is in a closed position such that a main valve face contacts, closes, and seals a main flow orifice, thereby stopping fluid communication between said upper flow channel and said middle flow channel.

12. The system of claim 11, wherein when closing said main valve, a pilot valve is urged by a controller to move upward, restricting the flow of drilling fluid through said pilot orifice and wherein a pilot valve face contacts said pilot valve seat, closing said pilot orifice, stopping the flow of drilling fluid through said pilot orifice, forcing some of said drilling fluid into a pilot flow exit passage and diverting some drilling fluid into a pilot flow channel and then further into a main valve pressure port(s) which allows for filling a main valve pressure chamber.

13. The system of claim 8, wherein when said main valve moves downward to ensure that a main valve face initiates contact with said main valve seat said main flow orifice is closed, thereby stopping drilling fluid flow between said upper flow channel and said middle flow channel.

14. The system of claim 13, wherein when contact between said main valve face and said valve seat occurs all drilling fluid is stopped within said flow modulator and thereby creating a primary pressure pulse.

15. The system of claim 14, wherein said primary pressure pulse and a subsequent primary seismic shock are sensed, recorded and analyzed via seismic sensing and monitoring instrumentation.

16. The system of claim 14, wherein increased pressure within a drill collar straightens an entire drill string and, with an uphole drill string secured, forces a downhole drill string into rockface.

17. The system of claim 1, wherein said flow modulator and said controller provides for an open time which indicates the amount of time said flow modulator remains in the open position and an associated dwell time, rise time, and fall time.

18. The system of claim 1, wherein said flow modulator valve is adjusted to ensure obtaining independent control of initial and subsequent waves by controlling pulse generation in order that said initial waves are increased in size when said valve is closed rapidly and said subsequent waves are increased in size when said valve is opened rapidly.

19. The system of claim 1 wherein a decoupling tool is employed within said drill string to decouple said pulsing device from any other device positioned above or below said pulsing device.

20. The system of claim 1, wherein a sensor is used to sense said seismic signal, seismic waves or waveform or waveforms at or near a surface of said borehole for correlation utilizing a reference signal for initial identification of the initial and subsequent seismic waves and assists the analysis system to improve overall signal to noise ratios.

21. The system of claim 1, wherein when a main valve is in an open position said open position allows drilling fluid to flow into and through a pilot flow channel, pilot orifice, a pilot flow exit passage and into a lower flow channel such that said main valve is held in the open position by the force of a main valve return spring.

22. The system of claim 21, wherein simultaneously said drilling fluid also flows into an upper flow channel formed by a flow diverter, past a main flow orifice into a middle flow channel and allows fluid to continue to a lower flow channel and then into a bottom of a wellbore such that a main valve pressure chamber pressure is lower than the pressure of said drilling fluid and a main valve return spring allows continued fluid communication with said main flow orifice, said upper flow channel and said middle flow channel.

23. An apparatus, in combination with a measurement while drilling (MWD) device, for generating pressure pulses in a drilling fluid comprising: a flow modulation device longitudinally positioned within a drill collar flow channel such that drilling fluid flows through said drill collar through a main flow orifice proceeded by a main ring valve body; said main ring valve body comprising; a pilot flow tube with a pilot flow channel, pilot valve, pilot orifice, and a main valve body axially and centrally located therein, and; a linearly moveable main ring valve axially located and in interference with and external to said main ring valve body, wherein said apparatus forms a main valve pressure chamber in fluid communication with said pilot flow channel through a main valve pressure port, and; wherein said pilot valve is urged to close against said pilot orifice thereby stopping flow of said drilling fluid within said pilot flow channel such that said drilling fluid fills said main valve pressure chamber axially urging said ring valve against said main ring valve body closing off said main flow orifice resulting in stopping said drilling fluid flow, thereby generating and transmitting a primary pressure pulse.

* * * * *